(12) United States Patent
Takase et al.

(10) Patent No.: US 7,133,363 B2
(45) Date of Patent: Nov. 7, 2006

(54) STORAGE SWITCH WITH BANDWIDTH CONTROL FUNCTION

(75) Inventors: Masayuki Takase, Kokubunji (JP); Takeki Yazaki, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 231 days.

(21) Appl. No.: 10/889,139

(22) Filed: Jul. 13, 2004

(65) Prior Publication Data
US 2005/0157752 A1     Jul. 21, 2005

(30) Foreign Application Priority Data
Jan. 16, 2004    (JP)    ............... 2004-008619

(51) Int. Cl.
*H04J 1/16*     (2006.01)
*H04J 3/14*     (2006.01)
(52) U.S. Cl. .............. 370/230; 370/235; 370/236; 370/468
(58) Field of Classification Search ........... 370/236, 370/389, 468, 392, 401, 229, 230, 230.1, 370/235, 395.2, 395.21
See application file for complete search history.

(56) References Cited

U.S. PATENT DOCUMENTS

| 6,205,119 | B1 | 3/2001 | Kaczynski |
| 2001/0032269 | A1 | 10/2001 | Wilson |
| 2002/0048277 | A1* | 4/2002 | Bennett ............... 370/412 |
| 2003/0235187 | A1* | 12/2003 | Iwama et al. .......... 370/352 |
| 2004/0019686 | A1 | 1/2004 | Toyoda et al. |
| 2004/0047294 | A1 | 3/2004 | Ain et al. |
| 2004/0136370 | A1 | 7/2004 | Moore et al. |
| 2006/0050690 | A1* | 3/2006 | Epps et al. ........... 370/359 |

FOREIGN PATENT DOCUMENTS

| JP | 2003-283551 | 7/1998 |
| JP | 2000-349763 | 6/1999 |

* cited by examiner

Primary Examiner—Ajit Patel
(74) Attorney, Agent, or Firm—Reed Smith LLP; Stanley P. Fisher, Esq.; Juan Carlos A. Marquez, Esq.

(57) ABSTRACT

A storage switch with bandwidth control function for preventing discarding of packets for bandwidth breach when sending or receiving storage data using an iSCSI protocol on a wide area network having a covenant (guaranteed) bandwidth, when the quantity of storage data traffic sent by the initiator or target was judged a bandwidth breach or violation. The traffic amount is predicted from the Expected Data Transfer Length contained in the read request of the iSCSI command and the Desired Data Transfer Length contained in the R2T command, when that command is sent to the target and the initiator and the bandwidth is regulated by controlling the transmission timing of that command.

9 Claims, 17 Drawing Sheets

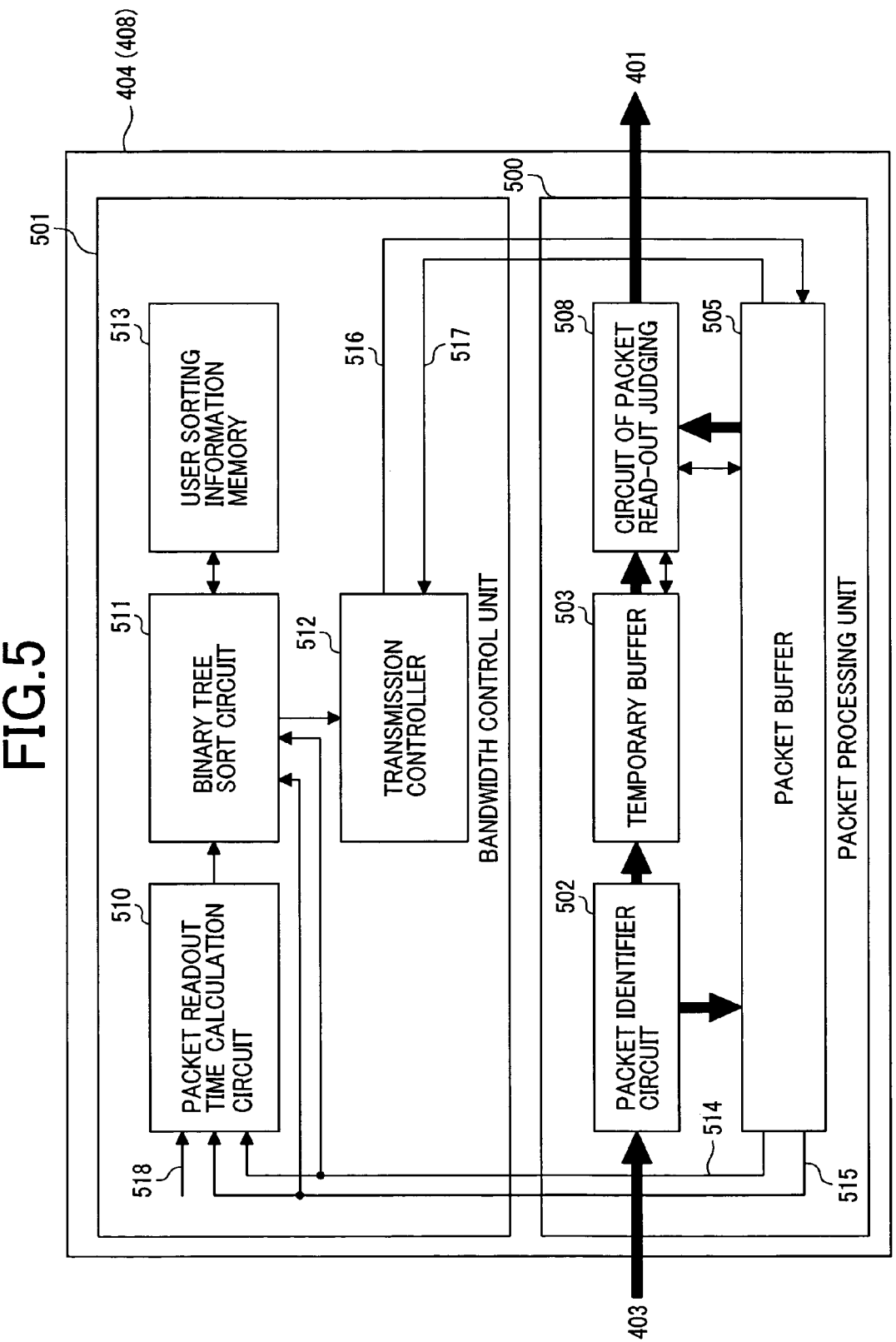

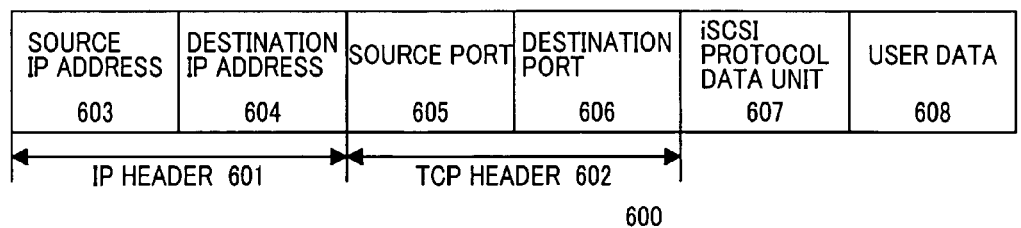

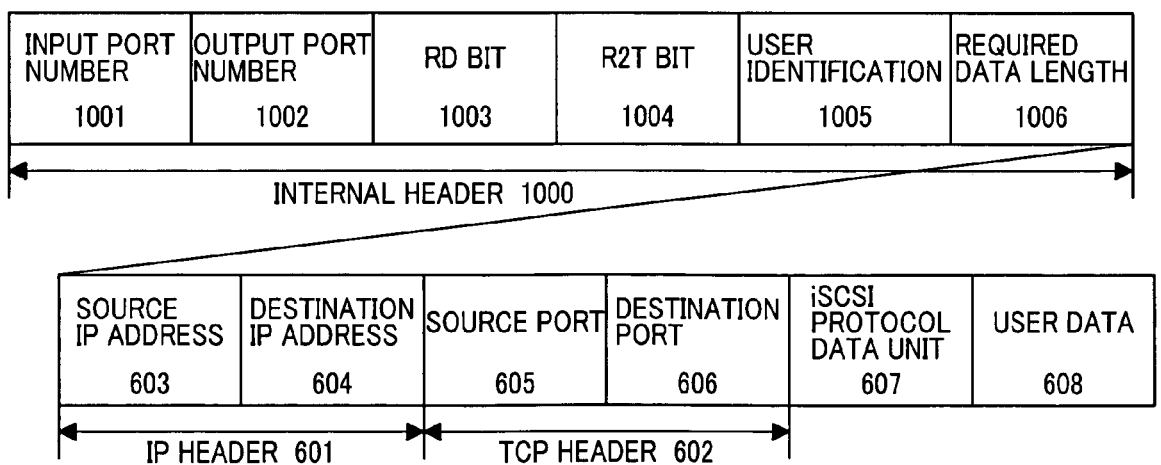

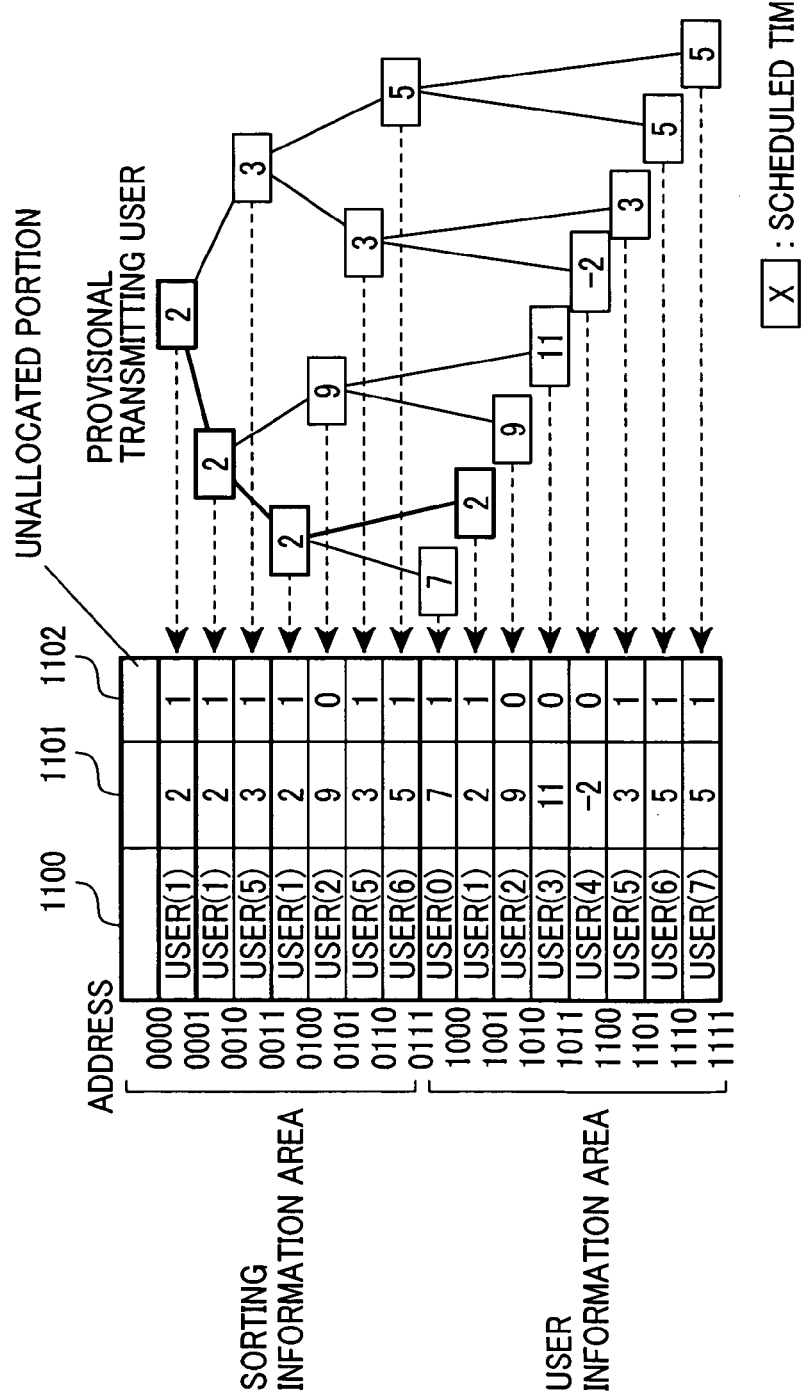

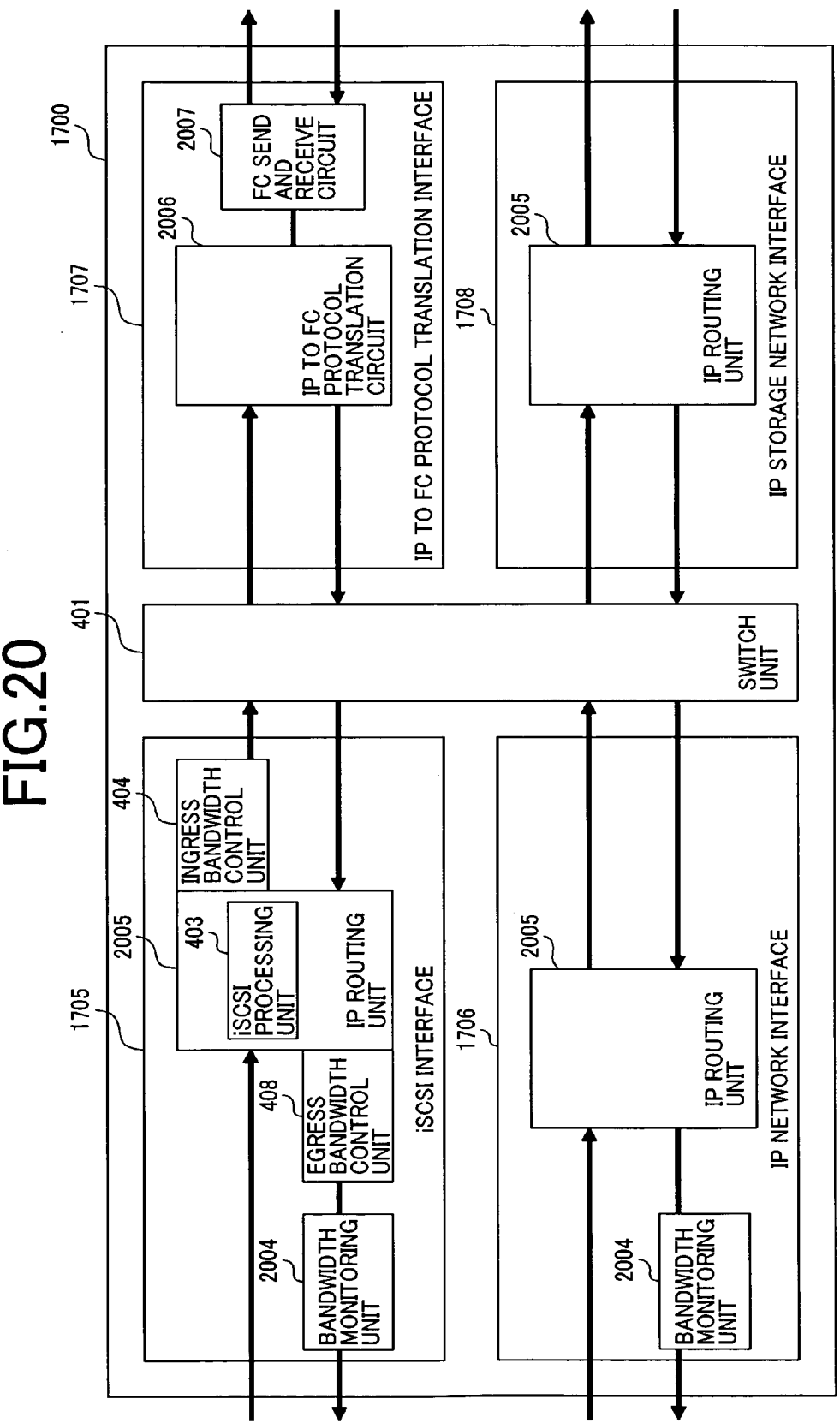

STORAGE SWITCH WITH BANDWIDTH CONTROL FUNCTION

CLAIM OF PRIORITY

The present application claims priority from Japanese application JP 2004-008619 filed on Jan. 16, 2004, the content of which is hereby incorporated by reference into this application.

FIELD OF THE INVENTION

The present invention relates to a storage switch containing a bandwidth control function for forming a bandwidth for transferring storage data.

BACKGROUND OF THE INVENTION

A standard known as iSCSI uses TCP/IP (Transmission Control Protocol/Internet Protocol) for capsuling commands on SCSI (Small Computer System Interface) which is a standard for connecting personal computers and peripheral devices such as storage devices. By utilizing iSCSI, the user can access (RD (read) data, WR (write) data, etc.) peripheral devices (hereafter storage devices, but may be any iSCSI compatible device) such as storage devices compatible with iSCSI on IP networks by using SCSI commands. Here, the device that issues commands is called the initiator and the device that receives and processes those commands is called the target. The IP packet containing the iSCSI command is here referred to as the iSCSI packet.

FIG. 1 for example shows an application where a user 100-$i$ ($i$=1 through n) is accessing other users on iSCSI through a datacenter 103 by utilizing a wide area network 102 comprised of an IP network or wide area Ethernet (registered trademark) that guarantees the user bandwidth. The datacenter 103 internally contains a storage switch 104 and a storage device 105-$i$ ($i$=1 through n) that make up the IP-SAN or FC-SAN 106 (hereafter SAN is used as a general name for IP-SAN and FC-SAN) The console 107 makes the storage switch 104 settings. The operation of the wide area network 102 connecting the user 100 and the datacenter 103 is guaranteed by a bandwidth guarantee service so that no discarding of data occurs when the traffic volume is within the contract bandwidth.

A UPC (User Parameter Control) function is generally used in QoS (Quality of Service) control of the wide area network 102. This UPC function utilizes a packet switching system 101 at the entry point to the network to monitor whether or not the user is sending or receiving data within the contract bandwidth. The QoS control is a technology for guaranteeing the communication band set for each user on IP networks mainly using best effort type. When the UPC detects traffic exceeding the contract bandwidth, the packet in violation is discarded on the spot, or a data transfer priority system is used that for example sets a low data transfer priority for discard candidates when traffic congestion has occurred within the wide area network.

FIG. 2 is a concept view showing the case when a user 100 is reading data in the data storage device 105-$i$ within the datacenter 103 using the application of FIG. 1. For purposes of simplification, only one user and one storage device are shown and the others are omitted. The method for loading (reading out) data from the storage device 105-$i$ is described here using FIG. 2. First of all, in order to request data from the storage device 105-$i$, the user 100 sends a data read request as an iSCSI command. More specifically, this request is an iSCSI packet (hereafter read request packet) set with a 1 in the Rbit, and an operation code of 0x01 for the BHS (Basic Header Segment) of the iSCSI PDU (Protocol Data Unit). The read request packet 200 contains the data size (capacity) of the data requested by the user. More specifically, this data capacity is the Expected Data Transfer Length value (hereafter requested RD length) of the BHS set with 1 in the Rbit and an operation code of 0x01. The storage device 105-$i$ that received the read request packet 200 utilizes the SCSI Data-in (hereafter RD data packet) command 201 with a BHS operation code of 0x25 for the iSCSI PDU) in an iSCSI packet to send the requested read length to the user 100. If the read data exceeds the MTU (Maximum Transfer Unit) then the packet is divided into multiple read (RD) data packets and sent. The above described the process flow during data loading.

One read request packet 200 has a small data capacity of about 100 bytes. The data size of the RD data packet (Data-in PDU) 201 however varies according to the data amount requested by the user and in many cases is several dozen to several hundred kilobytes more. Therefore even if the traffic of the read request packet 200 the user sends to the storage device 105-$i$ is within the contract bandwidth, the traffic quantity of the RD data packet 201 the storage device 105-$i$ sends to the user might be outside (might violate) the user contract bandwidth. An RD data packet 201 that violates the contract bandwidth is unable to arrive at the user 100 due to being a packet discarded at the congestion spot within the wide area network for a bandwidth breach (violation) 202 or a packet discarded by QoS control 203 at the packet switching system 101.

FIG. 3 is a concept view showing the case when a user 100 is writing data in the data storage device 105-$i$ within the datacenter 103 using the application of FIG. 1. For purposes of simplification, only one user and one storage device are shown and the others are omitted. The method for writing data onto the storage device 105-$i$ using iSCSI is described here. First of all, in order to request writing onto the storage device 105-$i$, the user 100 sends a data write request as an iSCSI command. More specifically, this request is an iSCSI packet (hereafter write request packet) set with a 1 in the Wbit, and an operation code of 0x01 for the BHS (Basic Header Segment) of the iSCSI PDU (Protocol Data Unit). The storage device 105-$i$ that received this write request packet 300 sends an R2T command (more specifically this {R2T packet} Ready to Transfer has an operation code 0x31 for the BHS of the iSCSI PDU) 301 as an iSCSI packet to the user 100. This R2T packet 301 has the task of showing the user 100 that the preparation made by the storage device 105-$i$ for writing the data sent from the user 100 is complete. The R2T packet 301 holds information on how many bytes of data were accepted at one time. More specifically, this information is the Desired Data Transfer Length Value (hereafter requested WR length). The user 100 that received the RT2 packet 301, sends the requested WR length data of R2T packet 301 to the storage device 105-$i$, utilizing the Data-out command iSCSI packet 302. More specifically, this Data-out command iSCSI packet 302 is an SCSI Data-out {hereafter WR data packet} packet having an operation code of 0x05 of the BHS of the iSCSI PDU. If this write data exceeds the network path MTU then the packet is divided into multiple write (WR) data packets and sent. The above description explained the process flow during data writing (WR).

The same as when reading data (RD), there is a large difference between the WR data packet 302 data size, and the WR request packet 300 data size, and the R2T packet 301 data size. So though the WR request packet 300 sent by the user 100 to the storage device 105-$i$, and the R2T packet 301 traffic quantity sent to the user 100 by the storage device 105-$i$ will fit within the user contract bandwidth, the traffic quantity of the WR data packet (Data-out PDU) 302 sent by the user to the storage device 105-$i$ might violate the user contract bandwidth. An WR data packet 302 that violates the contract bandwidth is unable to arrive at the storage device 105-$i$ due to being a packet discarded at the congestion spot within the wide area network for a bandwidth breach (violation) 303 or a packet discarded by QoS control 304 at the packet switching system 101.

The iSCSI utilizes TCP/IP for the host protocol. Therefore transmit must be re-performed when data discarding occurs along the path. However, where the discard quantity is large, wasted traffic occurs on the wide area network 102, leading to wasteful resource consumption of the storage switch 104 and the storage device 105-$i$ and causes a deterioration in overall device performance.

The IP network of the related art required a device called a traffic shaper to control the bandwidth at the entry point to the wide area network in order to prevent the transmitted data bandwidth on the wide area network 102 from exceeding the user contract bandwidth. This traffic shaper regulates (shaping) the traffic so that the amount of transmitted data sent by the user to the wide area network does not exceed the contract bandwidth, and prevents discarding of the transmitted data on the wide area network 102. One example of a patent for a bandwidth control device for guaranteeing that data greater than the contract bandwidth is not sent to the wider area network 102 is shown in Patent document 1. The bandwidth control device disclosed in Patent document 1 temporarily stores the packet sent from the user in a buffer within the bandwidth control device. Next, the packets loaded from the buffer are constantly measured. When the packet quantity loaded from the buffer has exceeded the contract bandwidth, the data amount sent from the user to the wide area network is controlled so as not to exceed the contract bandwidth by temporarily stopping the loading (read-out) of packets from the buffer.

[Patent document 1] JP-A No. 349763/2000

Applying the bandwidth control device of Patent document 1 to the network shown in FIG. 1 causes the following three problems. A first problem is that a condition occurs where RD data packets and WR data packets are issued at one time in large quantities (From hereon this conditions is called a burst.). When this burst is input to a bandwidth control device, the buffer overflows and data is discarded at this point. The storage data is characterized in having a large capacity and being burst prone compared to data sent and received conventionally over IP networks. So in order to achieve bandwidth control without discarding the RD data packet 201 and the WR data packet 302, the traffic shaper must have a large capacity from several to several dozen megabytes for each user. Maintaining such a large capacity buffer for each user is extremely difficult and even if actually achieved will have poor expandability.

A second problem is that the storage device 105-$i$ and the user computer terminal impose a greater load than required. The bandwidth control device of Patent document 1 sends a packet just for confirming that the data amount sent over the wide area network is within the contract bandwidth. The RD request packet 200 and the R2T packet 301 contain transmit request data length information. The storage device 105-$i$ and the computer terminal of the user that received these iSCSI packets, transfer data in bursts, regardless of whether the amount of transmitted data is within the contract range. Even if these bursts of data exceeding the contract bandwidth of the network are loaded, this data is delayed by the bandwidth control device or is discarded. Loading of data larger than the contract bandwidth of the wide area network therefore causes wasted storage device 105-$i$ and user computer terminal resources.

A third problem is that the bandwidth of the RD data packet 201 must be controlled on the storage device 105-$i$ side, and the WR data packet 302 bandwidth must be controlled on the user 100 side. A bandwidth control device is therefore needed on both the storage device 105-$i$ side and the user 100 side.

The bandwidth control device of the conventional art for IP networks was therefore incapable of efficiently controlling the storage data bandwidth and incapable of preventing the waste of storage device and user computer terminal resources.

SUMMARY OF THE INVENTION

In view of the above problems with the bandwidth control device of the related art, the present invention has the object of providing a storage switch with bandwidth control function, requiring only a network on the storage device side, having excellent expandability, not needing a large capacity buffer, and with bandwidth control not requiring the sending of data in excess of the contract bandwidth to user terminal and storage device.

To achieve the above objects, the storage switch with bandwidth control function of the present invention controls the bandwidth by estimating the RD data amount that the target will send to the network when the RD request packet was sent to the target based on the request RD length in the RD request packet. The bandwidth control function of the present invention also estimates the WR (write) data amount that the initiator will send to the network in the same way, based on the request WR length in the R2T packet when sending that R2T packet to the initiator.

Problems resolved by the present invention other than those mentioned above, as well as means for resolving those problems are clarified in the "Detailed Description of the Preferred Embodiments" and their accompanying drawings.

The present invention does not require a large sized (capacity) buffer such as is needed in the bandwidth control device of the related art that controls the bandwidth by buffering the RD data packets and WR data packets. The present invention further has excellent expandability since large capacity buffers are not required. The present invention further does not send RD request packets and R2T packets to the storage device and user computer terminal that generate traffic that is in excess of the contract bandwidth on the wide area network. Therefore the traffic load applied to the user computer terminal and storage device is no higher than necessary. The bandwidth control of the RD data and WR data can be achieved on one unit.

BRIEF DESCRIPTION OF THE DRAWINGS

FIG. 5 is concept view showing the ingress bandwidth control unit within the switch interface of FIG. 4;

FIG. 6 is a view showing on example of a packet format for iSCSI packets;

FIG. 7 is a concept view showing one example of a header format for the iSCSI header section;

FIG. 8 is a concept view showing one example of a header format for the iSCSI header section;

FIG. 9 is a concept view showing one example of a header format for the iSCSI header section;

FIG. 10 is a drawing showing one example of a packet format for the internal section of the storage switch of FIG. 4;

FIG. 11 is a drawing showing the user sorting information memory, and this memory address in a binary tree diagram relation;

FIG. 20 is a structural diagram of the storage switch for multi-protocol.

DETAILED DESCRIPTION OF THE PREFERRED EMBODIMENTS

In the following embodiments, examples of the device containing the bandwidth control function for controlling the volume of RD (read) data and WR (write) data traffic generated when the user has accessed a device on the network is described next.

First Embodiment

Figure 18:
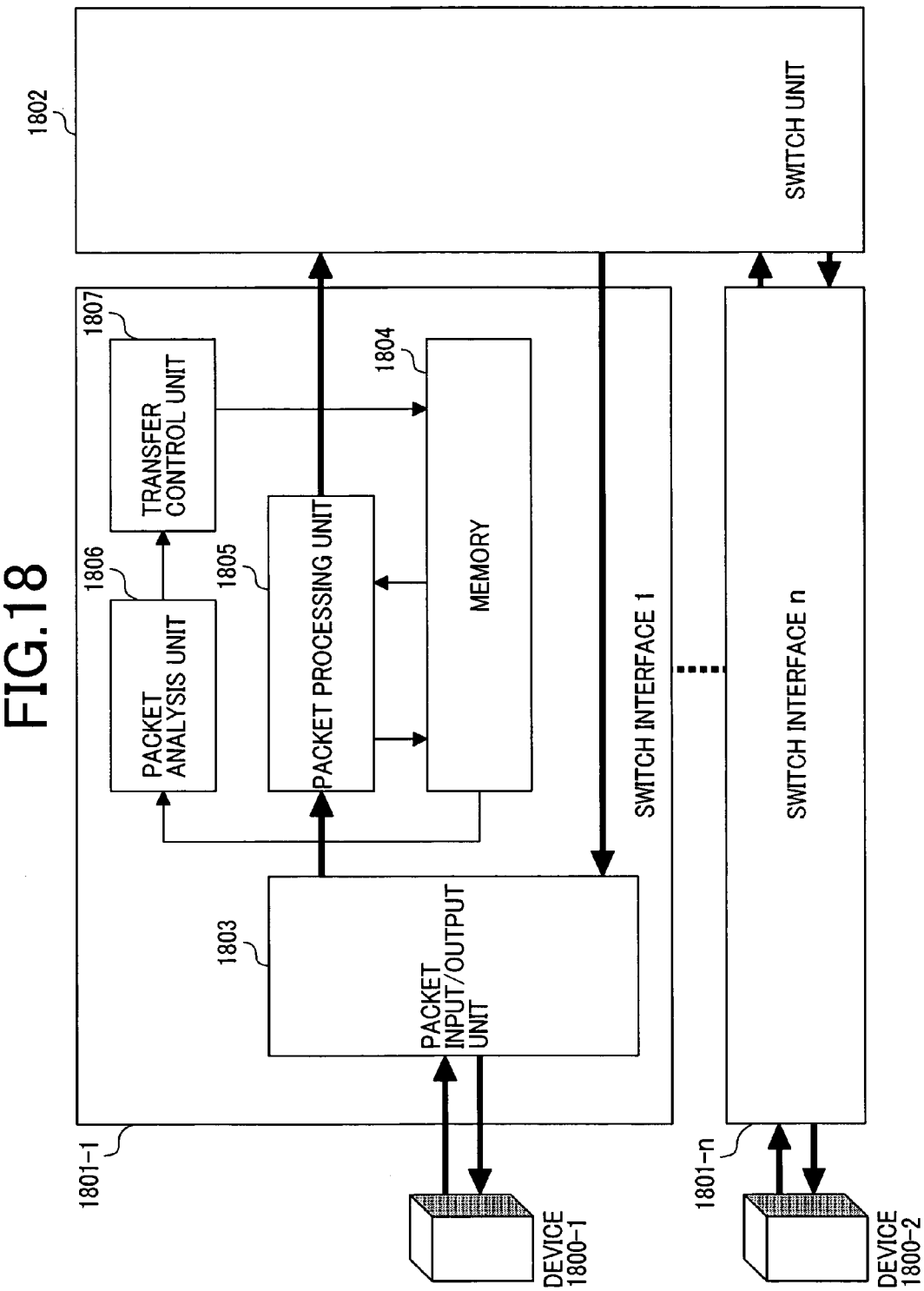
FIG. 18 is a block diagram of a storage switch containing the bandwidth control function of the present invention.

The embodiments of the present invention are described next in detail. FIG. 18 is a block diagram showing the structure of device of the present invention.

The storage switch containing the bandwidth control function of the present invention is made up of the switch interfaces 1801 through n, and the switch unit 1802.

The switch interfaces 1801-n are made up of a packet input/output control unit 1803 connecting the device 1800-1 and the device 1800-2, a packet processing unit 1805, a memory 1804 for holding the packet, a packet analysis unit 1806 for analyzing the packet being held, and a transfer control unit 1807 to grant permission to transfer the packet being held in the memory 1804.

The device 1800-1 through device 1800-2 in FIG. 18, connect directly to the storage switch. However other switches may also be installed between the device 1800 and the storage switch. The number of devices 1800 may also be more than three.

When the packet sent by the device 1800-1 is input to the storage switch, it is then transferred to the packet processing unit 1805 by way of the packet input/output control unit 1803. The packet processing unit 1805 decides whether or not the packet that was input is the packet whose data was requested to be sent to the device 1800-2. When decided that is the packet whose data was requested to be sent to the device 1800-2, the packet processing unit 1805 writes that packet into the memory 1804. If not the requested packet then that packet is sent to the switching unit.

The memory 1804 stores the written packet until a transmit signal arrives. The packet header is sent to the packet analysis unit 1806.

When the device 1800-2 has received the packet, the packet analysis unit 1806 that received the packet header from the memory 1804, reads out the data amount to send to the device 1800-1 from the device 1800-2, and transfers the information on the data amount that the device 1800-2 sends to the device 1800-1 along with the user identification information to the transfer control unit 1807.

The transfer control unit 1807 controls the intervals in which the packets are sent so as not to exceed the network bandwidth supplied to the device 1800-1, as a data amount sent to the device 1800-1 from the device 1800-2 when the packet the device 1800-1 sent to the device 1800-2 was received by the device 1800-2.

The transfer control unit 1807 sends a packet transmit signal to the memory 1804 even when a packet is sent to the device 1800-2, and when determined that the data sent from the device 1800-2 does not exceed the network bandwidth supplied to the device 1800-1.

The memory 1804 sends a packet indicating the signal to the switching unit 1802 when the packet transmit signal was received from the transfer control unit 1807.

The switching unit 1802 transfers the packet to the switch interface 1801-n that output the packet.

The storage switch performs the same processing for packets whose data was requested to be sent from the device 1800-2 to the device 1800-1.

The operation of the switch unit 1802, the packet input/output switch 1803, the packet analysis unit 1806, the packet processing unit 1805, the transfer control unit 1807 performed by function modules containing respective processors and memory devices. However, other structures may be used if the objects of the present invention can be achieved with structures and functions equivalent to those in FIG. 18.

By utilizing the storage switches containing the bandwidth control functions of the present invention, the amount of data sent from the device 1800 can be restricted to an amount within the network bandwidth supplied to the devices 1800.

Second Embodiment

Hereafter, an embodiment of the present invention is described. In this embodiment, a storage switch containing the bandwidth control function of the present invention is applied to a network utilizing iSCSI protocol. The example described in this embodiment uses iSCSI protocol. However any protocol may be used if capable of analyzing the command requesting the data and acquiring the requested data amount.

Figure 1:
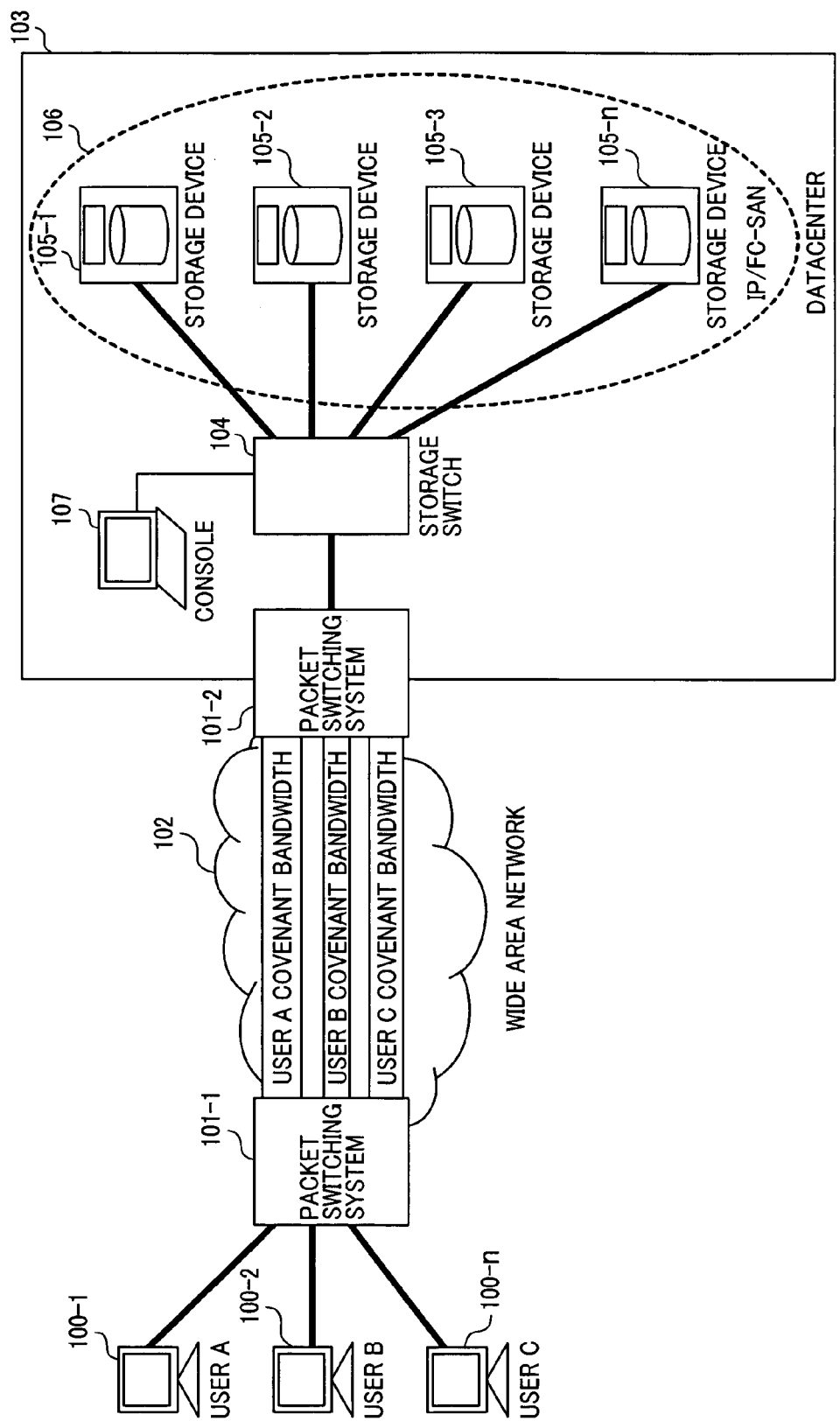
FIG. 1 is a concept block diagram showing an example of a network utilizing the storage switch of the present invention.
Figure 2:
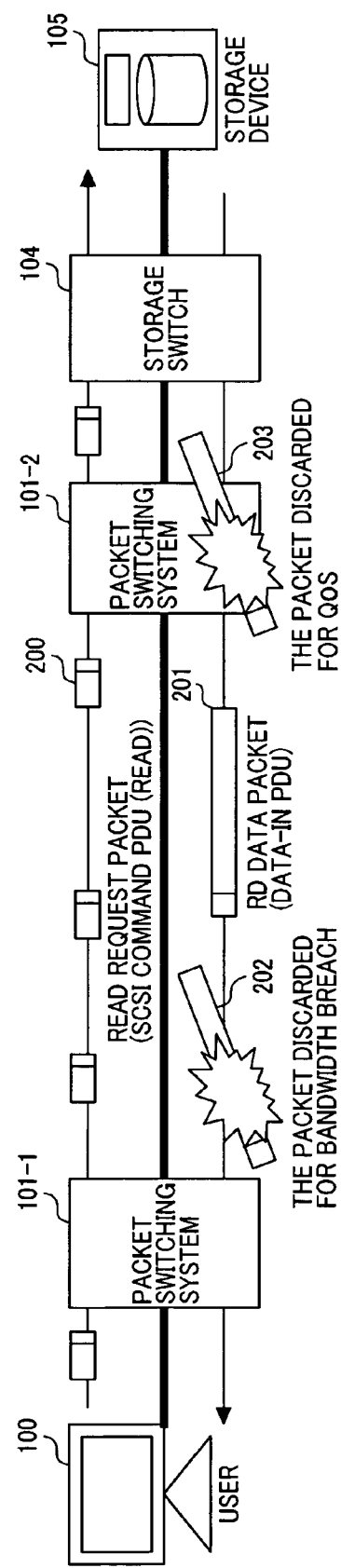
FIG. 2 is concept view showing loading of data from the user onto the storage device.
Figure 3:
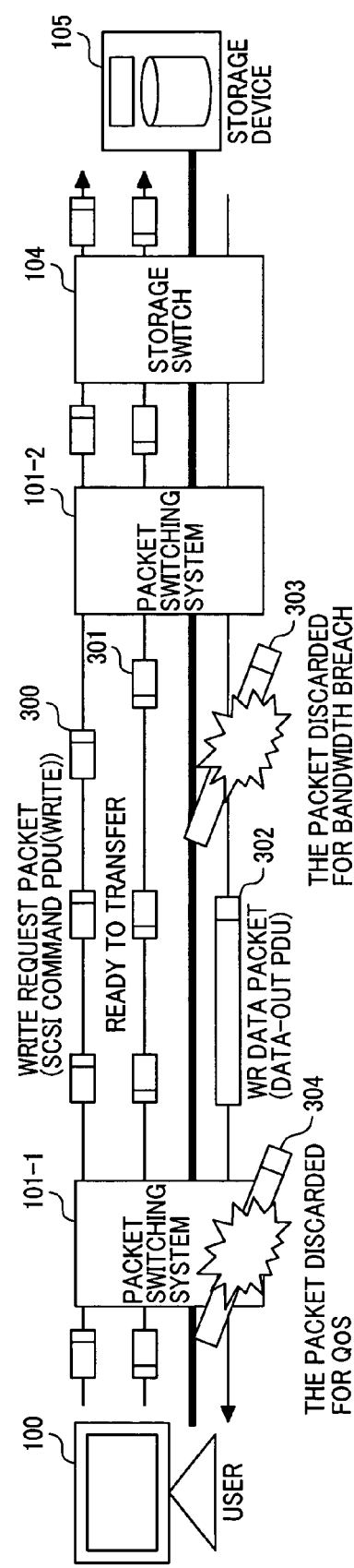
FIG. 3 is a concept view showing the writing of data from the user onto the storage device.
Figure 4:
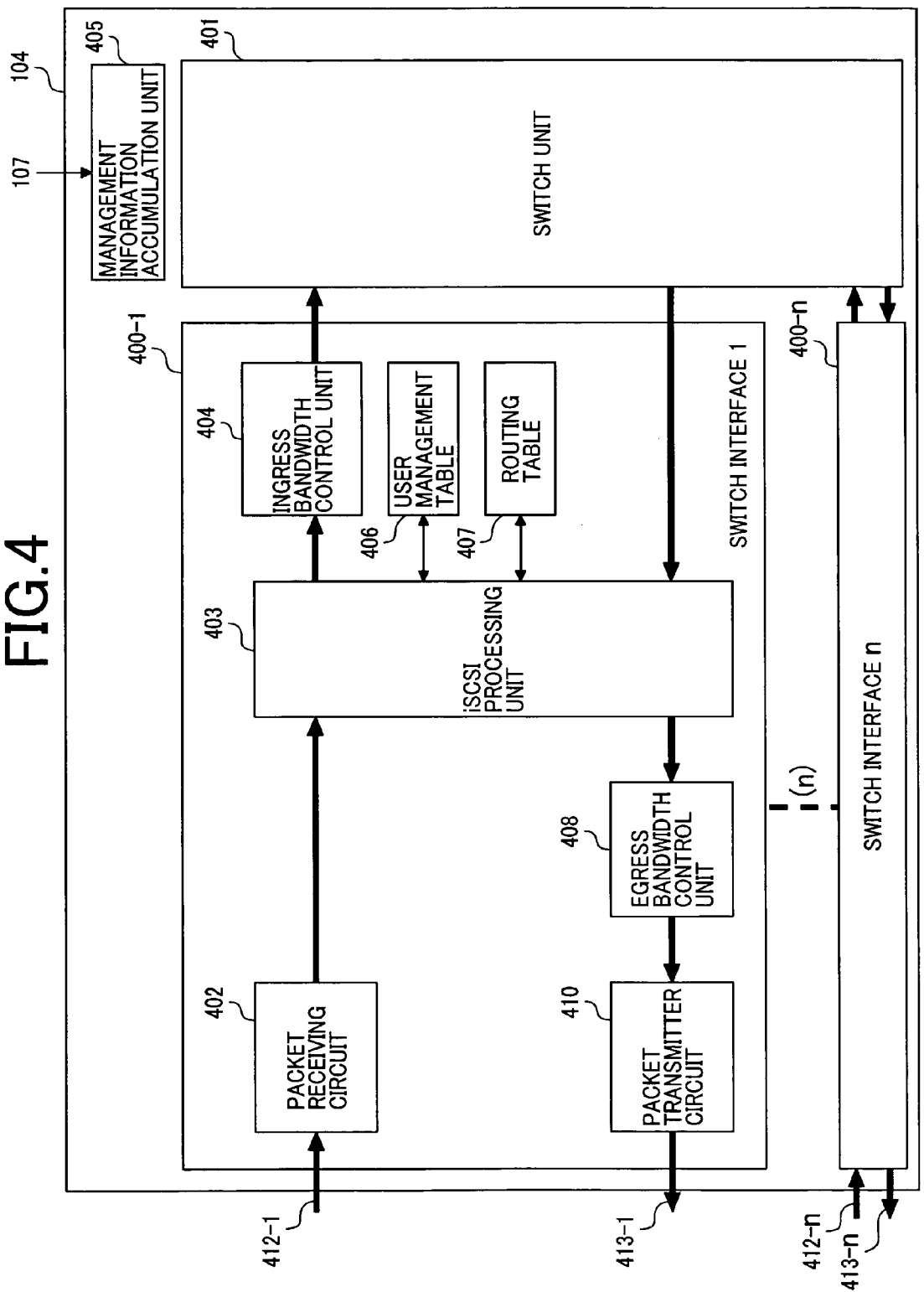
FIG. 4 is a concept view showing the storage switch containing the bandwidth control function of the present invention.

The storage switch containing the bandwidth control function of the present invention is first explained utilizing FIG. 1 and FIG. 4. The storage switch 104 is installed for example in the datacenter 103 and comprised of a storage device 105-$i$ such as a RAID device or JBOD (Just Bunch Of Disks) and the SAN 106 connected on an IP network. The storage switch 104 and the storage device **105-*i*** may also be a configuration connected by multiple switches (not shown in drawing).

The storage switch 104 performs unified control of the storage volume information such as LU (Logical unit) of the storage device **105-*i*. When the user 100 is requesting RD/WR (read/write) on the storage device 105-*i*, an iSCSI packet is sent to the target constituted by the storage switch 104 that performs unified control of storage device 105-*i* information. The storage switch 104 terminates the iSCSI packet from the user 100. The storage switch 104 as the initiator, then transfers the iSCSI packet from the user to the storage device 105-*i***.

FIG. 4 is a block diagram showing the storage switch 104 of the present invention. The storage switch 104 is made up of n number of input ports **412-*i* (i=1 through n) to input packets and, n number of output ports 413-*i* (i=1 through n) to output packets and, n number of switch interfaces 400-*i* (i=1 through n), and a switching unit 401, and a management information accumulation unit 405**.

Though not shown in the drawing, there are two types of switch interfaces. One type is a switch interface **400-*i* containing a bandwidth control function and a function for processing iSCSI packets. Another type is an interface solely for routing IP packets and does not contain a function for processing iSCSI packets. The switch interface connecting to the packet switching system 101-2 utilizes the interface containing the bandwidth control function. The switch interface connecting to the storage device 105-*i*** does not contain a bandwidth control function.

The management information accumulation unit 405 sends contract bandwidth information for the wide area network 102 for each user 100, and initializing information such as information on LUN within the storage devices and storage devices **105-*i* capable of RD/WR (read/write) by the user, to each of these interfaces. The initial setting information is set from the console 107**.

The switch interface **400-*i* is made up of a packet receiving circuit 402 for receive processing the packets, an iSCSI processing unit 403 for terminating the iSCSI packet and authenticating the user 100, as well as establishing the storage volume information of the storage device 105-*i*, an ingress bandwidth control unit 404, an egress bandwidth control unit 408, a packet transmitter circuit 410 for transmitting packets, a user management table 406 for managing the storage device 105-*i* storage volume information and for managing the storage device 105-*i* volume information capable of being accessed by the user 100, and a routing management table 407 for managing the IP packet routing information. An IP address is assigned to the switch interface 400-*i*. One input/output line (port) for each interface is shown in FIG. 4** however multiple lines (ports) may be provided.

The switch unit 401, the packet receiving circuit 402, the iSCSI processing circuit 403, the ingress bandwidth control unit 404, a management information accumulation unit 405, an egress bandwidth control unit 408, a packet transmitter circuit 410 are implemented by function modules containing processing devices and storage devices. The user management table and the routing table are respectively executed by information within the memory devices. However, other structures may be used if capable of achieving the objects of the invention with functions equivalent to the device structure in FIG. 4.

FIG. 6 shows an example of the iSCSI packet 600 in the wide area network 102. The iSCSI packet format 600 for the wide area network 102 is made up of an IP header 601, a TCP header 602 and iSCSI protocol data unit (header) 607 and a user data 608. The IP header 601 is comprised of a source IP address 603 (address of terminal sending the packet), the destination IP address (address of terminal receiving the packet). The TCP header 602 is comprised of a source port No. 605 to show the transmit source protocol (=host application), and the destination port 606 showing the destination protocol. The contents of the iSCSI header 607 change according to the type of command sent by the target or initiator (main types of commands are iSCSI commands (0x01) and R2T (0x31) and data-out (0x05) and data-in {0x25}, etc.).

FIG. 7, FIG. 8 and FIG. 9 are examples of iSCSI headers for iSCSI packet formats in the wide area network 102.

FIG. 7 shows an example of a header format for the iSCSI protocol data unit (header) 607 when the initiator has sent a read request or write request to the target. The iSCSI protocol data unit (header) 607 that expresses the RD (read)/WR (write) request is made up of a Final (F) bit 701, a Read (R) bit 702, a Write (W) bit 703, an LUN 704, an initiator task tag 705, an expected data transfer length 706, and an expected read-data length 707. The F bit 701 is set to a 0 when the commands are comprised of multiple packet and following packets are present. The F bit 701 is set to a 1 when there are no following packets. The F bit is set to a 1 even when the command is comprised of only one packet, since there are no following packets. The R bit 702 is set to 1 when requesting RD data. The W bit 703 is set to 1 when requesting WR data. The LUN704 expresses the logical unit No. of the storage device i. The initiator task tag 705 is a tag set by the initiator device that issued the command. The initiator task tag 705 is used for managing tasks. The expected data transfer length 706 stores the requested RD length when there is a unidirectional RD request and stores the requested WR length when there is a unidirectional WR request. The expected read-data length 707 is used when there is a bidirectional operation for RD data/WR data with a 1 set in both the R bit 702 and the W bit 703. The data length of the WR data is stored in the expected data transfer length 706 when there is a bidirectional (operation) request for RD data/WR data. Therefore, the data length of the RD data is stored in the expected read-data length 707 when there is a bidirectional (operation) RD data/WR data request. The expected read-data length 707 is attached to the iSCSI option header only when there are bidirectional (operation) RD data/WR data requests.

FIG. 8 shows an example of the iSCSI protocol data unit (header) 607 of the R2T command for transferring write request commands received by the target, to the initiator. The R2T is comprised of the LUN 704, initiator task tag 705 and target transfer tag 801 and R2T sequence number (SN) 802 and the (WR) desired data transfer length 803. The value of the WR request packet initiator task tag is stored unchanged in the initiator task tag 705. The target transfer tag 801 is a tag set by the target device that received the WR request packet. This target transfer tag 801 is used for managing the tasks. The R2TSN 802 expresses the sequence number of the R2T packet used in reply to the WR request packet. The initiator identifies the job by means of the initiator task tag 705 and the R2TSN 802. The WR request length expresses the size of the WR data transferable from the initiator or in other words the size of WR data capable of being received by the target.

FIG. 9 shows an example of a header format of the iSCSI protocol data unit (header) 607 used to transfer Read data or Write data. The RD data/WR data transfer format is comprised of an F bit 701, an initiator task tag 705, a target transfer tag 801, and a data sequence number (SN) 901. The DataSN901 is a sequence number of a data group for RD data packet or a WR write data packet reply to an RD request packet or an R2T packet. The initiator or the target identifies the job by means of the initiator task tag 705 and target transfer tag 801. A 1 is set in the F bit in the final packet of the RD data packet or the WR data packet to indicate the end of the RD data packet or WR data packet.

FIG. 10 shows the packet format in the storage switch 104 of the present invention. The packet format in the storage switch 104 contains an internal header 1000 within the packet format for the wide area network 104. This internal header 1000 is comprised of an input port number 1001 as the identifier for the port where the packet is input, an output port number 1002 as an identifier for the port where the packet is output, a user identification number 1005 as the identifier for the user that sent the packet, a RD bit 1003 to show the RD request packet, an R2T bit 1004 to show the R2T packet, and a required data length 1006 to store the desired data transfer length in the case of an R2T packet, or the requested RD length in the case of an RD request packet.

The packet receiving circuit 402 attaches the internal header 1000 when the packet is input by the input port 412-*i* of the storage switch 104 of the present invention. The port number of the input port 412-*i* that input the packet is written in the input port number 1001 and transferred to the iSCSI processing circuit 403. At this time, the values written in the output port number 1002, the user identification number 1005, the RD bit 1003, R2T bit 1004 and the required data length 1006 have no particular meaning.

When the packet is received from the packet receiving circuit, the iSCSI processing circuit 403 confirms the destination IP address 604. The iSCSI processing circuit 403 transfers the packet to the ingress bandwidth control unit 404 after performing the following processing when the packet is address to its own switch interface 400-*i* and is not a WR data packet. The user that sent the packet from the source IP address is identified and the user identification number is written into the user identification number 1005. The table for finding the user identification number from the source IP address is managed by the user management table 406.

The IP address of the storage device 105-*i* that the user is attempting to access from the LUN 704 of iSCSI protocol data unit 607, as well as the actual LUN of that storage device are then established. The linking table for establishing the IP address of the storage device 105-*i* and the LUN actually assigned to the storage device 105-*i*, from LUN704 of iSCSI protocol data unit (header) 607 for the iSCSI packet sent by the user is managed by the user management table 406. The routing table is next searched by using the IP address established of the storage device that was established and the output port (line) number is established. This IP address established for the storage device is overwritten onto the destination IP address 604; the LUN actually assigned to the storage device is overwritten onto the LUN 704 of the iSCSI protocol data unit 607; and the output port number is written onto the output port number 1002 of the internal header 1000. Next, the packet received from the iSCSI protocol data unit 607 is identified. If an RD request packet, a 1 is written in the RD bit 1003, a 0 is written in the R2T bit, and the requested data length (If an RD data request command, then this is expected data transfer length 706. If a RD data/WR data bidirectional request command, then this is the expected read data length 707) is written in the required data length 1006. In the case of other commands, a 0 is written in the RD bit 1003, the R2T bit 1004 and the required data length bit 1006.

The IP address assigned to its own switch interface 400-*i* is written into the source IP address. The IP address for its own switch interface 400-*i* is held in the IP address register (not shown in drawing) and can be set from the console 107. When a RD data/WR data bidirectional request command is set with a 1 bit in both the R bit 702 and the W bit 703 of the iSCSI protocol data unit (header) 607, the RD request packet and the WR request packet are generated from header information by the iSCSI processing unit 403, and after attaching an internal header are processed in the iSCSI processor. The command information that was generated is managed in the user management table. Packets addressed to its own interface 400-*i* and that are not WR data packets are stored in the user management table as information (hereafter user management information) such as initiator task tag 705, user identification number 1005, the LUN that was specified by the user, and the LUN actually assigned to the storage device 105-*i*.

If the packet received by the iSCSI processor is an WR data packet then the user management information is already entered in the user management table so the following processing is performed. In this processing, the user management table is searched from information such as the source IP address 603 and the initiator task tag 705. The IP address of storage device 105-*i* for transferring WR data packets is changed to the (addressee) destination IP address; and the source IP address is changed to the interface's own IP address. The output port number from the routing management table is established and written in the output port number 1002, and the LUN704 value inside the iSCSI header is changed to the LUN of the storage device 105-*i*. Next, the WR data packet is sent to the ingress bandwidth control unit 404. The entry in the user management table 406 is deleted if there is a 1 in the F bit 701 of the iSCSI protocol data unit (header) 607 of the WR data packet that was received.

When the destination IP address of the packet that the iSCSI processor received is not addressed to its own switch interface, then it is sent to ingress bandwidth control unit 404 after the following processing is performed. First of all, the routing management table 407 is searched and the output port number established from the destination IP address. The output port number is written in the output port number 1002. A 0 is written in the RD bit 1003 and the R2T bit 1004, the user identification number 1005 and the required data length 1006.

The ingress bandwidth control unit 404 contains a queue for each user. The ingress bandwidth control unit 404 checks the RD bit 1003 of the internal header 1000 and if the value is a 1 accumulates those packets in the specified queue. The ingress bandwidth control unit 404 judges the queue for sending the packet based on the contract bandwidth for each user, loads (reads out) the packet from that queue, and transfers the packet to the switch unit 401. If the value of the RD bit 1003 of the internal header 1000 is 0, then the ingress bandwidth control unit 404 immediately sends the packet to the switch unit 401.

The switch unit 401 switches the packet according to the output port number 1002, and transfers the packet to the iSCSI processing unit 403.

The iSCSI processing unit 403 checks the destination IP address 604 of the packet that was received from the switch unit. If the packet is for its own switch interface 400-*i* then the iSCSI processing unit 403 sends the packet to its own command buffer 408 on the output side after performing the following processing. First of all, the iSCSI processing unit 403 calls up user information stored as information such as the source IP address 603 and the initiator task tag 705. The user destination IP address, the LUN specified by the user, and the user identification number are established from the user management information. The user identification number that was determined is then written into the user identification number 1005 of the internal header 1000; the IP address overwritten onto the destination IP address 603, and the LUN specified by the user is written onto the LUN704 of the iSCSI protocol data unit (header) 607. The user management information is stored in the user management table 406 when the iSCSI packet is received from the initiator. Next, the packet received from the iSCSI protocol data unit (header) 607 is next identified. If the packet is an R2T packet, then a 0 is written in the RD bit 1003; and a 1 is written in the R2T bit 1004, and the expected data transfer length 706 is written in the required data length 1006. If there are other commands, then a 0 is written in the RD bit 1003 and the R2T bit 1004 and the required data length 1006. An IP address assigned to its own switch interface 400-i is written in the transmit source IP address. In the case of other iSCSI packets other than R2T packets, user management information stored in the user management table is deleted from the user management table.

When the destination IP address of the packet that the iSCSI processor receives from the switch unit 401 is not addressed to its own switch interface, the iSCSI processor transfers the packet to the egress bandwidth control unit 408 without performing any processing.

The egress bandwidth control unit 408 contains a queue for each user. The egress bandwidth control unit 408 checks the R2T bit 1004 of the internal header 1000 and if the value is a 1 accumulates those packets in the specified queue. The egress bandwidth control unit 408 judges the queue for sending the packet based on the contract bandwidth for each user, loads (reads out) the packet from that queue, and transfers the packet to the packet transmitter circuit. Bandwidth control is performed. If the value of the R2T bit 1004 of the internal header 1000 is 0, then the egress bandwidth control unit 408 sends the packet to the packet transmitter circuit 410.

The packet transmitter circuit 410 deletes the internal header 1000 when the packet is received and transmits the packet to the output port 413-i.

Figure 12:
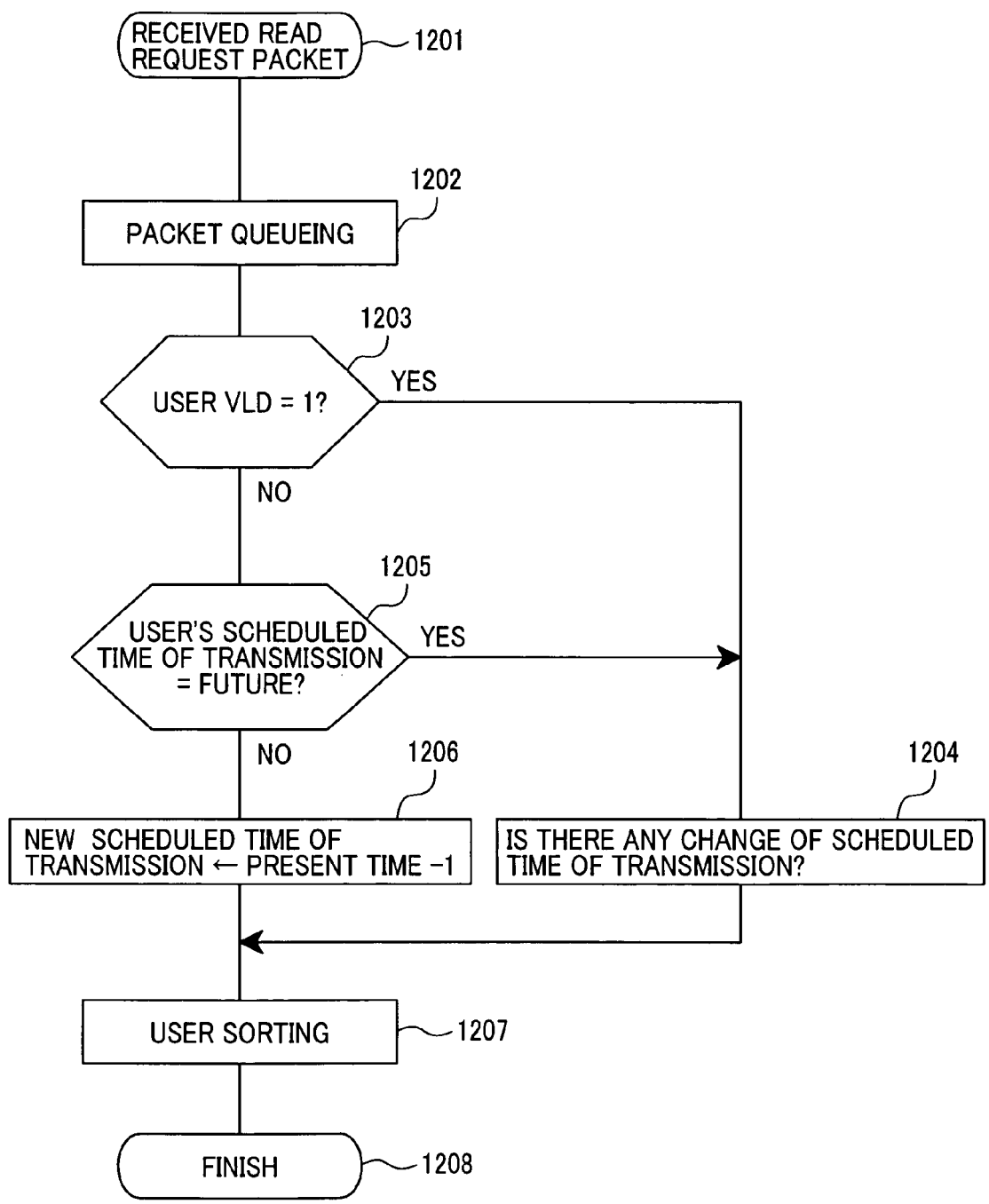
FIG. 12 is a flow chart of the process when receiving a bandwidth control unit packet.
Figure 13:
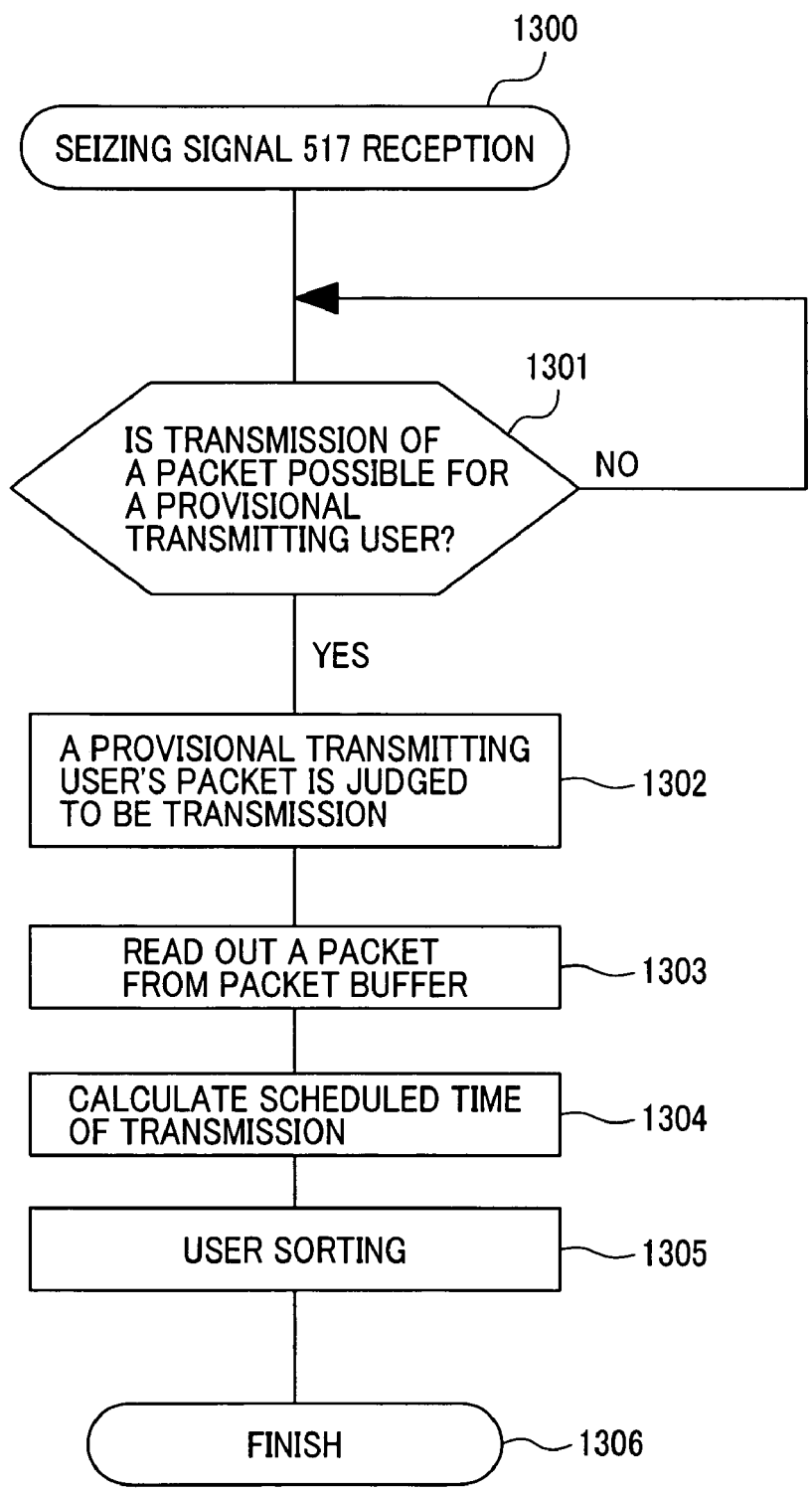
FIG. 13 is a flow chart of the process when sending a bandwidth control unit packet.

The operation of the ingress bandwidth control circuit 404 of the present invention is next described in detail. FIG. 5 is a block diagram of the ingress bandwidth control circuit 404 of the present invention. A flow chart of the process during transmitting and during receiving of the bandwidth control unit 501 packet is shown in FIG. 12 and FIG. 13. The ingress bandwidth control circuit 404 is made up of a packet processing unit 500 and a bandwidth control unit 501.

The packet processing unit 500 is comprised of a packet identifier circuit 502 for identifying the type of packet sent from the iSCSI processing unit 403, a temporary buffer 503 for temporarily storing packets other than the read request packet 200, a packet buffer 505 to store the read request packets 200 in the queue of each user, and a packet read-out judgment circuit 508 to determine the packet from among either the temporary buffer 503 or the packet buffer 505.

The bandwidth control circuit 501 is comprised of a packet readout time calculation circuit 510 for calculating the scheduled time of transmission according to the contract bandwidth of each user, a binary tree sort circuit 511 (in other words, sorting by the scheduled time of transmission) for selecting the fastest predicted transmit time flow among each user packet, a transmission controller 512 for determining the user performing packet transmission utilizing the results from the binary tree sort circuit 511, and conveying this to the packet processing unit 500, and a user sorting information memory 513 for storing information required for sorting by the binary tree sort circuit 511. The console 107 sets the contract bandwidth of each user. The contract bandwidth for each user that was set from the console is stored in the management information accumulation unit 405, and is sent as the user bandwidth information 518 to the local memory (not shown in drawing) of the (packet) packet readout time calculation circuit 510 for each interface.

The user sorting information memory 513 stores the user identification (number) 1100, the scheduled time of transmission 1101, VLD 1102 (a flag showing whether or not there is a transmit standby RD request packet for each user). These three items (1100, 1101, 1102) are referred to as user sorting information. The memory format for this user sorting information memory 513 is shown in FIG. 11. FIG. 11 shows the case when the number of users is eight. The sorting information from the user (0) to the user (7) in the entries corresponding to the addresses from 1000 to 1111 is stored in the user number sequence. Information for selecting the user with the fastest scheduled time of transmission is stored (described in detail later) in the entries corresponding to the addresses 0000 or 0111. The area from address 1000 to 1111 is called the user information area. The area from address 0000 to 0111 is called the sorting information area.

The ingress bandwidth control unit 404 performs the following processes 1 through 3 during receiving of a packet; and performs the following processes 4 through 6 during transmission of a packet.

(Process 1) Receive packet identification process
(Process 2) Calculate scheduled time of transmission (during packet receive)
(Process 3) Sorting procedure (during packet receive)
(Process 4) Packet transmit user selection process
(Process 5) Calculate scheduled time of transmission (during packet transmission)
(Process 6) Sorting procedure (during packet transmission)

Each of these processes is next described in detail using FIG. 5, FIG. 12, FIG. 13. The user number p is attached, and a user (p) is recorded in order to identify multiple users.

(Process 1) Receive Packet Identification Process

The ingress bandwidth control unit 404 identifies whether or not a packet that arrived, has a 1 set in the RD bit 1003 of the internal header 1000 by means of the packet identifier circuit of packet processing unit 500. When determined that the arriving packet was set with a 1 in the RD bit 1003, and is identified as RD request packet, this packet is temporarily stored in the user queue of the packet buffer 505 (1201, 1202 of FIG. 12). If there is no 1 set on the RD bit 1003, then it is temporarily stored in the temporary buffer 503 since bandwidth control by the ingress bandwidth control unit 404 is not required. When the packet buffer 505 receives the RD request packet, the packet readout time calculation circuit 510 and the binary tree sort circuit 511 are notified of the user identification number as the packet receive information 514.

(Process 2) Calculate Scheduled Time of Transmission (During Packet Receive)

The packet readout time calculation circuit 510 that received the packet receive information 514 loads (reads out) the VLD information and scheduled time of transmission for the user sorting information of user (p) via the binary tree sort circuit 511. The packet readout time calculation circuit 510 also checks whether the VLD is a "0" or a "1" (1203 in FIG. 12). When the VLD is "1" this shows that there is already a transmit standby RD request packet for that user. In this case, the scheduled transmission time should not be changed since the bandwidth that was set cannot be used when a new scheduled transmission time. So the scheduled transmission time loaded from the user sorting information memory 513 and the information (VLD=1) that there is an RD request packet storage information "Present", is sent to the binary tree sort circuit 511 (1204 in FIG. 12).

However, when the VLD is "0", the bandwidth that was set cannot be maintained when the scheduled transmission time is changed, regardless of the fact that this already calculated scheduled transmission time is based on the current time. Therefore, the scheduled transmission time should not be rewritten (changed). The scheduled transmission time loaded from the user sorting information memory 513 and the information (VLD=1) that there is a RD request packet storage information "Present", is sent to the binary tree sort circuit 511 (1204 in FIG. 12). When the VLD is "0", and the already calculated scheduled transmission time is the same as the past or current time based on the current time (1205 in FIG. 12), then the RD request packet is in a state where it can be sent at any time so that the scheduled transmission time can be rewritten as needed to any convenient time. In this case, in order to send the packet for that receive RD request packet flow as fast as possible, when the new scheduled time of transmission=the present time+1, and an RD request packet storage information RD is determined to be "Present", this identified information is transmitted to the binary tree sort circuit 511 (1206 in FIG. 12).

(Process 3) Sorting Procedure (During Packet Receive)

When a packet is received, and the user scheduled transmission time changes, among the users, the user (provisional transmitting user) for whom the packet must be sent as fast as possible might possibly change. Sorting is performed in the binary tree sort circuit 511 for re-identifying the provisional transmitting user (1207 in FIG. 12).

Figure 14:
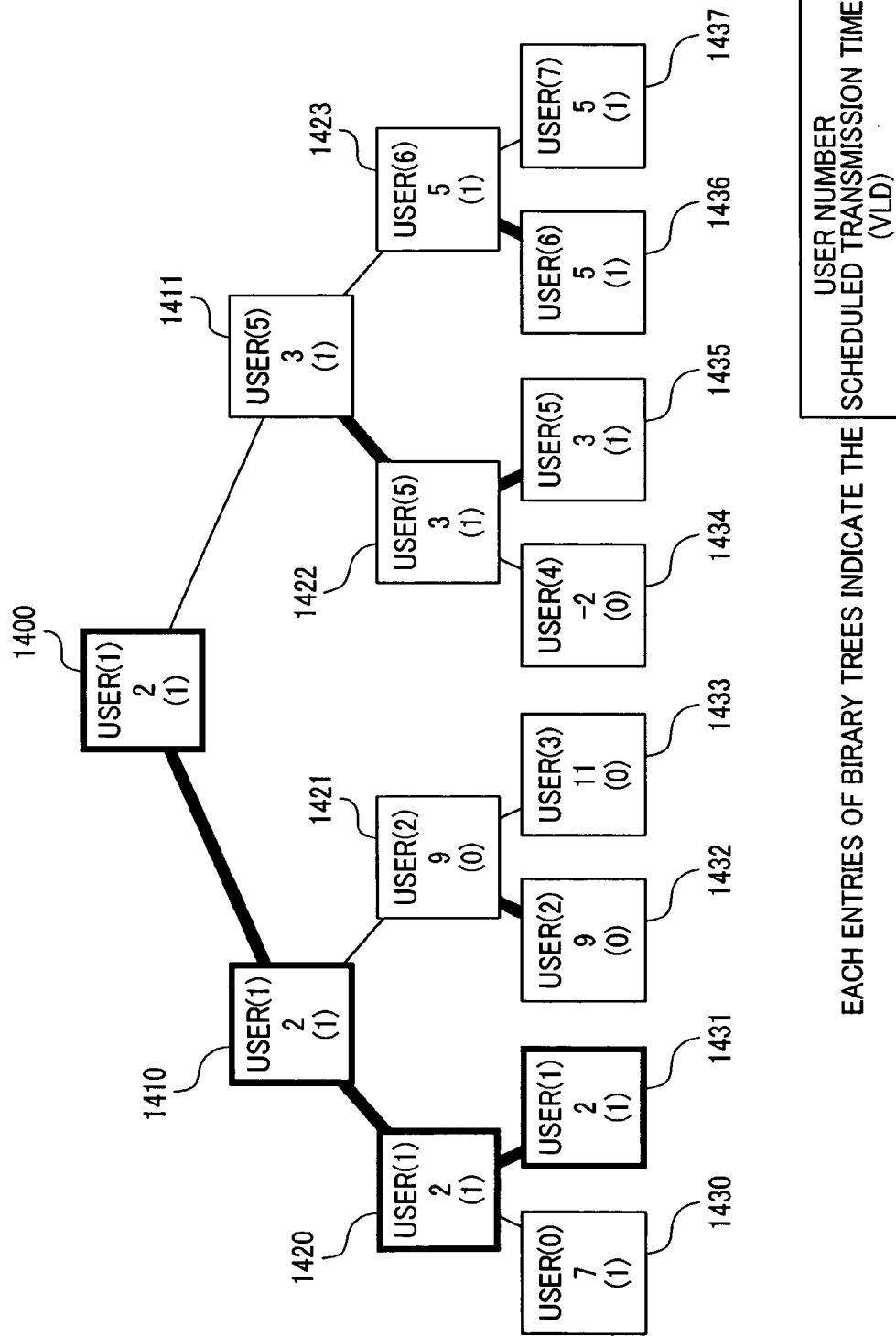
FIG. 14 is a diagram showing the two-branch tree structure.

In the following description, there are eight users (user (p): p is an integer from 0 to 7). Selecting a user as a provisional transmitting user from among these eight users is explained using FIG. 14 and FIG. 15. Here, FIG. 14 shows a binary tree structure for the sorting process. There are entries in the top of the binary tree (hereafter called the "root"), the branch points, and the tips (hereafter called the "leaves"). The entries at the root of the binary tree are the root entry, the entries positioned on the leaves are the leave entries. Entries on the root side as seen from an optional entry are parent entries, and the two entries on the leaf side are children entries.

The user identification number, the VLD (The integer in the parentheses (0 or 1) shows the VLD.) and scheduled transmission time for each user are stored in the leaf entries 1430 through 1437 of the user information area. The same information is stored for other entries with the exception of the leave entries. The parent entry holds one of the children entries under it. This entry is selected according to the rules below in [1] through [3].

[1] When the VLD of the children entries are both "1", the children (or child) entry with a scheduled transmission time further in the past then the present time is selected as the scheduled transmission time. For example, in the entry 1420, the information in entry 1431 is stored unchanged. If the scheduled transmission times are the same then either may be used.

[2] When one of the children entries are "1" and the other is "0", the children entry with a VLD of "1" is selected as the parent entry. For example, the VLD "1" information of entry 1435 is stored in the 1422 entry.

[3] When the VLD of the children entries are both "0", the children entry with a scheduled transmission time further in the past then the present time is selected as the scheduled transmission time. For example, the information of entry 1432 is stored unchanged in the entry 1421. If the scheduled transmission times are the same then either may be used.

The method for managing the user sorting information of the user sorting information memory 513 is described next. The number of users is M (=$2^m$). FIG. 11 is the memory map of the user sorting information memory 513 for holding the eight flows (m=3). The user identification number 1100 for the user, and the scheduled transmission time 1101, as well as the VLD 1102 are stored in the user sorting information memory 513 as described above. The relation of the user sorting information memory 513 to each entry is shown as follows. Addresses are hereafter shown in binary notation (m+1 bit).

(1) Here, the 000 . . . 001 are addresses corresponding to the binary tree root.

(2) The parent entry address is 0xy . . . yyy for the xyy . . . yyz entry. The two children addresses are yyy . . . yz0 and yyy-yz1. Addresses corresponding to the leaf entries are stored in addresses from 100 . . . 000 to 111 . . . 111 (all the m power of 2=M units). A circuit for generating addresses for accessing memories during sorting can easily be contrived by managing addresses in the memory according to these above rules. In other words, the corresponding item for the xyy . . . yyz address is the information stored in the xyy . . . yy (z) address (Here (z) indicates an inverted z state, between "0" and "1"); and those comparison results are written in the 0xy . . . yyy address.

Figure 15:
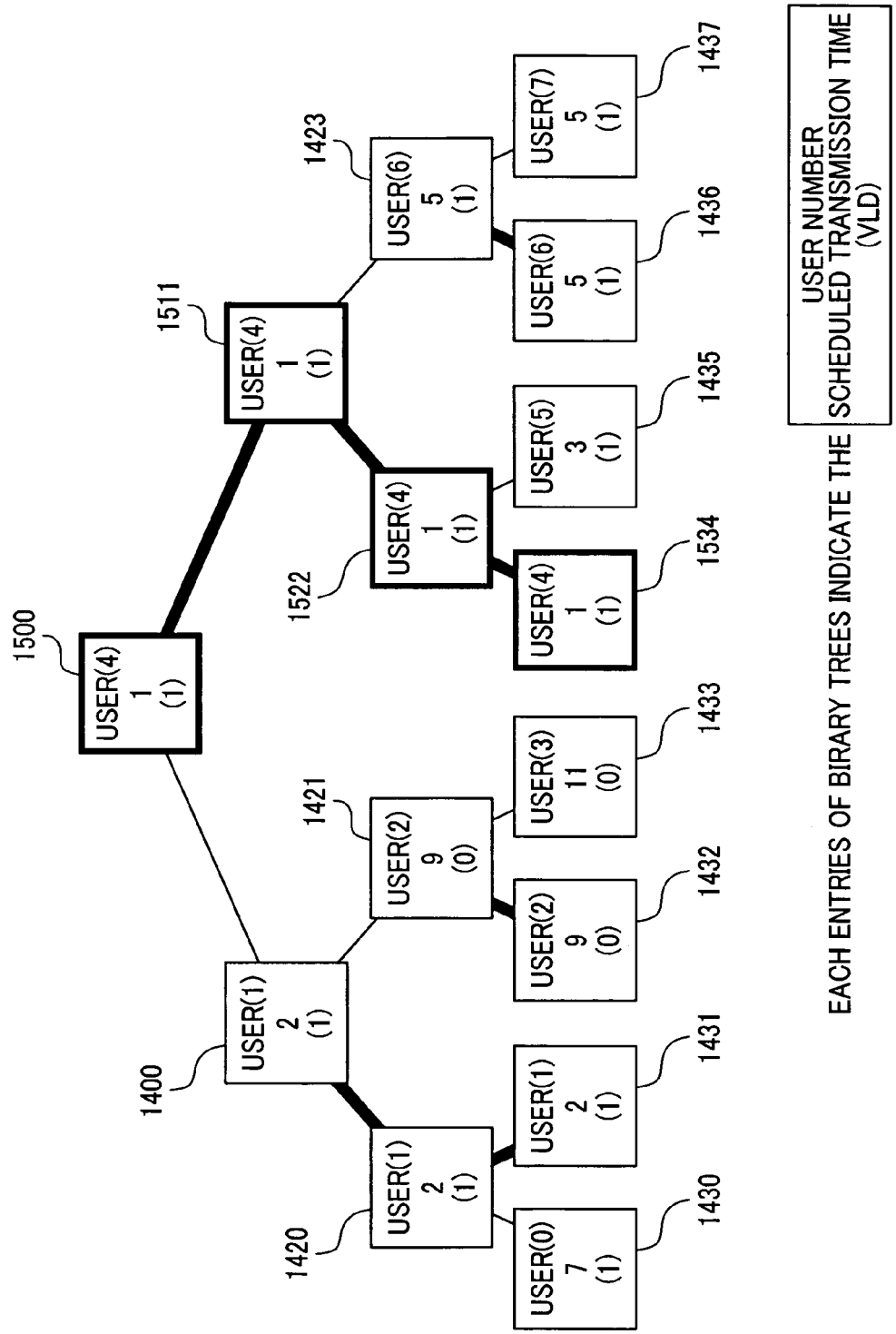
FIG. 15 is a diagram showing the two-branch tree structure.

The specific flow sorting process operation for the ingress bandwidth control unit 404 is described next. First of all, the binary tree sort circuit 511, rewrites the VLD for the leave entry corresponding to the user (p) of user sorting information memory 513 (This is usually a "1" since the packet storage information is always "Present" during receiving of an RD request packet) according to the value in the RD request packet storage information. The binary tree sort circuit 511 also rewrites the scheduled transmit time for notification by the packet readout time calculation circuit 510. For example in FIG. 14, the leave (or leaf) 1434 is rewritten when the scheduled transmit time for user (4) was changed (rewritten). Next, entries other than the leave entry are rewritten however this does not mean that all entries of the binary tree are rewritten. For instance, in the above example, only the entries 1422, 1411, and 1400 on the path from the leave entry 1434 towards the root entry 1400 were changed. The binary tree sort circuit 511 loads (reads out) these entries and rewrites the user identification number, scheduled transmission time, and VLD in compliance with the above described rules [1] through [3]. The rewrite (change) results are shown in FIG. 15 (1208 and 1209 of FIG. 12). The rewrite result user (4) is selected in the root entry (1500 through 1534 of FIG. 15). The packet receive process terminates when this (flow sorting) process ends.

The processes 4 through 6 during packet transmit are described next.

(Process 4) Packet Transmit User Selection Process

The provisional transmitting user selected by the binary tree sort circuit 511 is set as user (i). Also from hereon, a state where the present time was compared with the scheduled transmission time, and the scheduled transmission time is the same time or a past time based on the present time, is called an Okay to Transmit state for that user. When the transmit start signal 517 is received from the packet buffer 505, the transmission controller 512 loads (reads out) the scheduled transmission time and the VLD within the root entry of the user sorting information memory 513 and monitors whether or not the user (i) is in an Okay to Transmit state. If the user (i) is not in an Okay to Transmit state, then the process sets to standby until the scheduled transmission time is changed by receiving a packet, or the user again reaches an Okay to Transmit state due to the passage of time (1300 through 1302 in FIG. 13). If an Okay to Transmit state is reached, then the transmit okay signal 516 is sent to the packet buffer 505.

The packet buffer 505 that received the transmit okay signal 516, prepares to load (read out) the RD request packet from the queue of the user for the transmit request, and sends an identity request signal to the packet read-out judgment circuit 508. This packet read-out judgment circuit decides to load (read out) the packet from either the temporary buffer 503 or the packet buffer 505. The packet read-out judgment circuit 508 then sends this transmit decision signal to either the temporary buffer 503 or the packet buffer 505. The packet buffer 505 receives the transmit decision signal and sends an RD request packet (1303 in FIG. 13). The RD request packet transmit information 515 is made up of an identification number of the user that sent the RD request packet, the required data length 1006 of the transmitted RD reqeust packet and the presence of a stored packet (after the packet was sent) for that user. This RD request packet transmit information 515 is sent to the packet readout time calculation circuit 510 and the binary tree sort circuit 511. The packet buffer 505 sends a transmit okay signal 516 to the transmission controller 512 to inquire about the sending of the next RD request packet.

(Process 5) Calculate Scheduled Time of Transmission (During Packet Transmission)

The packet readout time calculation circuit 510 that received the RD request packet transmit information 515, calculates the scheduled transmission time according to the contract bandwidth set for the user (1304 in FIG. 13). To calculate a new scheduled time of transmission, the time period (interval) for sending for example, one byte of data may be stored and the following calculation then made.

New scheduled time of transmission=present scheduled transmission time+time interval×bite count of requested data length Another method is to calculate the new scheduled time of transmission so that the user bandwidth conforms to the Continuous-State Leaky Bucket Algorithm as disclosed in Chapter 4.4.2 of The ATM Forum Specification version 4.0.

Figure 19:
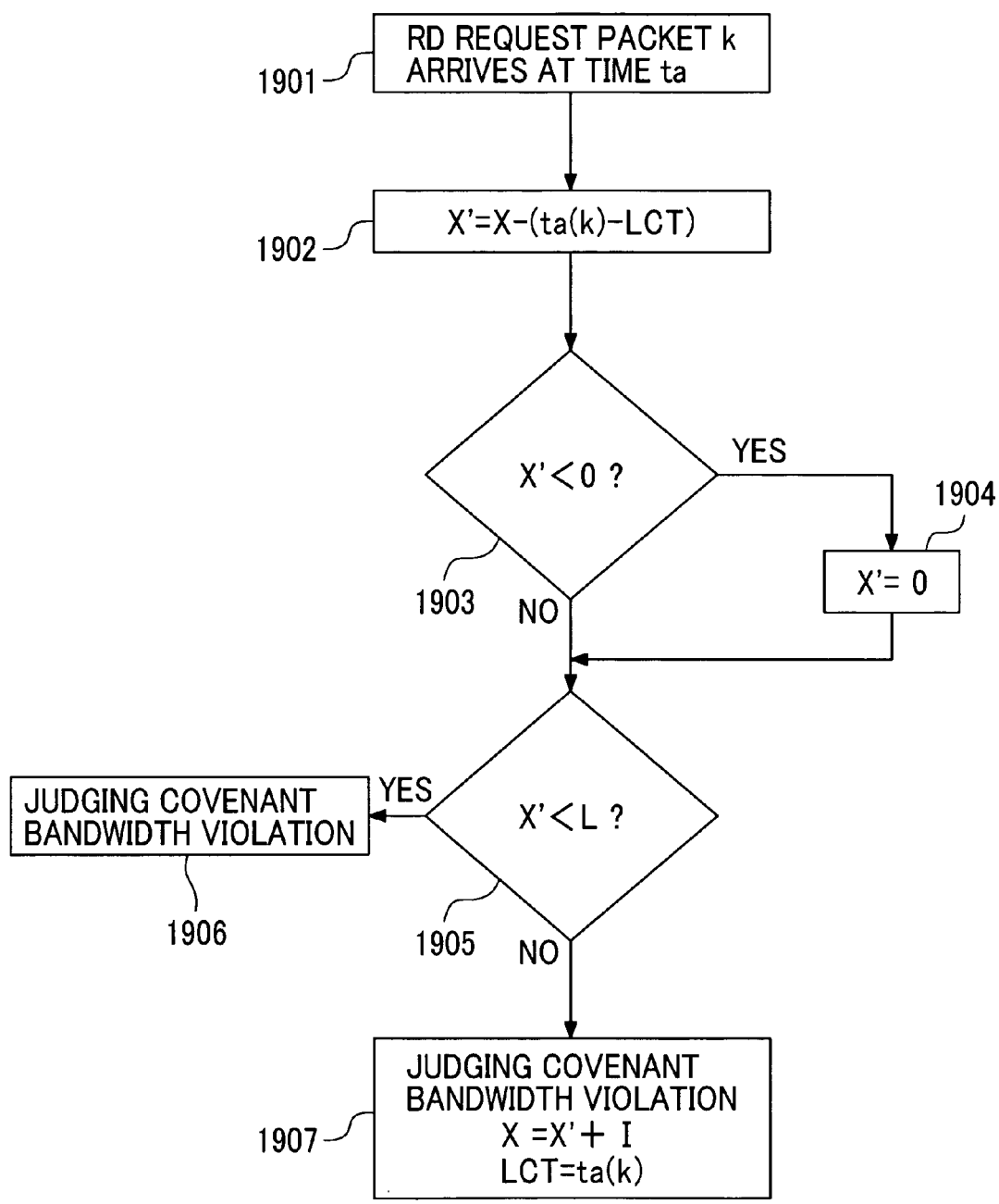
FIG. 19 is a flow chart of the leaky bucket algorithm.

The leaky bucket algorithm is expressed by a model of a bucket of a certain capacity having a hole in it. Water leaks from the bucket in a quantity proportional to the monitored bandwidth while the bucket contains water. The bucket is filled with water of the required data length when a RD request packet arrives. The bucket has a certain capacity for allowing bursts of RD data generated by the storage device and the user 100. The new time is judged to conform (okay) if the contract bandwidth is maintained without the bucket overflowing. The new time is in violation (fail) if the bucket overflows. FIG. 19 shows a flow chart of the leaky bucket algorithm.

When the RD request packet arrives at time ta (step 1901), the arrival time: differential versus LCT (equivalent to amount of water leaking from bucket) versus the RD request packet that was previously judged to conform (okay) is calculated. The value is subtracted from the counter value: X (corresponding to amount stored in bucket) to yield the value X'. In step 1902, if X' is a negative value then X' is corrected to "0" (step 1903 step 1904). The value X' is compared with the limit L (corresponding to bucket capacity) in step 1905. When X' is greater than or equal to L then the RD data sent from the storage device 105 is judged in violation (fail) in step 1906. When X' is less than L, the RD data is judged to conform (okay) and a fixed value I (water quantity corresponding to requested data length) determined by the monitor bandwidth and added to X' is stored as the value X in step 1907. When the first RD request packet has arrived, X is 0 and LCT is reset to the RD request packet arrival time.

The scheduled transmission time calculated by the above described method, and the presence of a stored packet within the RD request packet transmit information 515 are sent unchanged to the binary tree sort circuit 511.

(Process 6)

The same processing is performed when sending a RD packet with corrected scheduled transmission time, as when receiving an RD packet. (1305 and 1306 in FIG. 13). This process 6 corresponds to process 3.

The egress bandwidth control unit 408 operation of the present invention is described next. The egress bandwidth control unit 408 has the same structure as the ingress bandwidth control unit 404.

The differing point between the two units (404 and 408) is that while the ingress bandwidth control unit 404 controls transmission of the RD request packet so that the RD data packet traffic volume does not violate the contract bandwidth of the user wide area network; the egress bandwidth control unit 408 controls transmission of the R2T packet so that the WR data packet traffic volume does not violate the contract bandwidth of the user wide area network.

More specifically, the packet identifier circuit 502 checks whether or not a 1 is set in the R2T bit 1004 of the internal packet header 1000, identifies the R2T packet, and stores this R2T packet inside the packet buffer 505.

After the RD request packet is sent from the packet buffer 505, the ingress bandwidth control unit 404 sends an RD request packet transmit information 515 comprised of the required data, length 1006 of the transmitted RD request packet, a user identification number, and the presence of a stored packet (after the packet was sent) to the binary tree sort circuit 511 and the packet read-out time calculation circuit 510. After the R2T packet has been sent from the packet buffer 505, the egress bandwidth control unit 408 sends R2T packet transmit information comprised of request data length 1006 of the R2T packet that was sent, and a user identification number and presence of a stored packet (after the packet was sent) for that user, to the binary tree sort circuit and the packet read-out time calculation circuit. Other than the above, the operation of the ingress bandwidth control unit 404 and the egress bandwidth control unit 408 is the same.

The queue of the packet buffer 505 for sending the next packet can be swiftly selected by using the binary tree sort circuit described above.

The operation of the packet identifier circuit 502, packet identifier circuit 508, packet readout time calculation circuit 510, binary tree sort circuit 511, transmit controller 512 are achieved by function modules containing respective processing devices and storage devices. The temporary buffer 503, packet buffer 505 and the user sorting information memory 513 are respectively implemented by storage devices. However, a structure with other devices may be used if it achieves the same objects of the present invention with function equivalent to the device structure in FIG. 5.

The storage switch containing the bandwidth control function for iSCSI in the present invention is capable of controlling the bandwidth without accumulating RD data packets and WR data packets in the packet buffer section and therefore allows drastically reducing the buffer size (or capacity) in the bandwidth control section. Further, the R2T packet and the RD request packet can be transmitted at a timing that does not exceed the user contract bandwidth in the wide area network 102 so the data is not sent to the storage device and user computer terminal in excessive amount and therefore allows more effective use of resources. The bandwidth control device of the related art required two devices for bandwidth control of RD data packets and WR data packets from the user side entry point to the wide area network, and from the storage side entry point to the wide area network entrance. However, the device of the present invention is capable of controlling the bandwidth of both RD data packets and WR data packets on one device.

Further, a disk array control device can be implemented by incorporating a storage switch 104 and a storage device 108 into one device having the bandwidth control function of the present invention.

Third Embodiment

The third embodiment for the storage switch with bandwidth control function to iSCSI standards of the present invention is described next utilizing FIG. 16. The third embodiment contains a function for dividing up the RD request packet or R2T packet (Hereafter, the RD request packet and R2T packet are referred to with the general name of data request packet.) into multiple data request packets when requested data length is large. Utilizing the present embodiment allows setting an upper data size limit on one data request packet sent from the initiator or the target.

Figure 16:
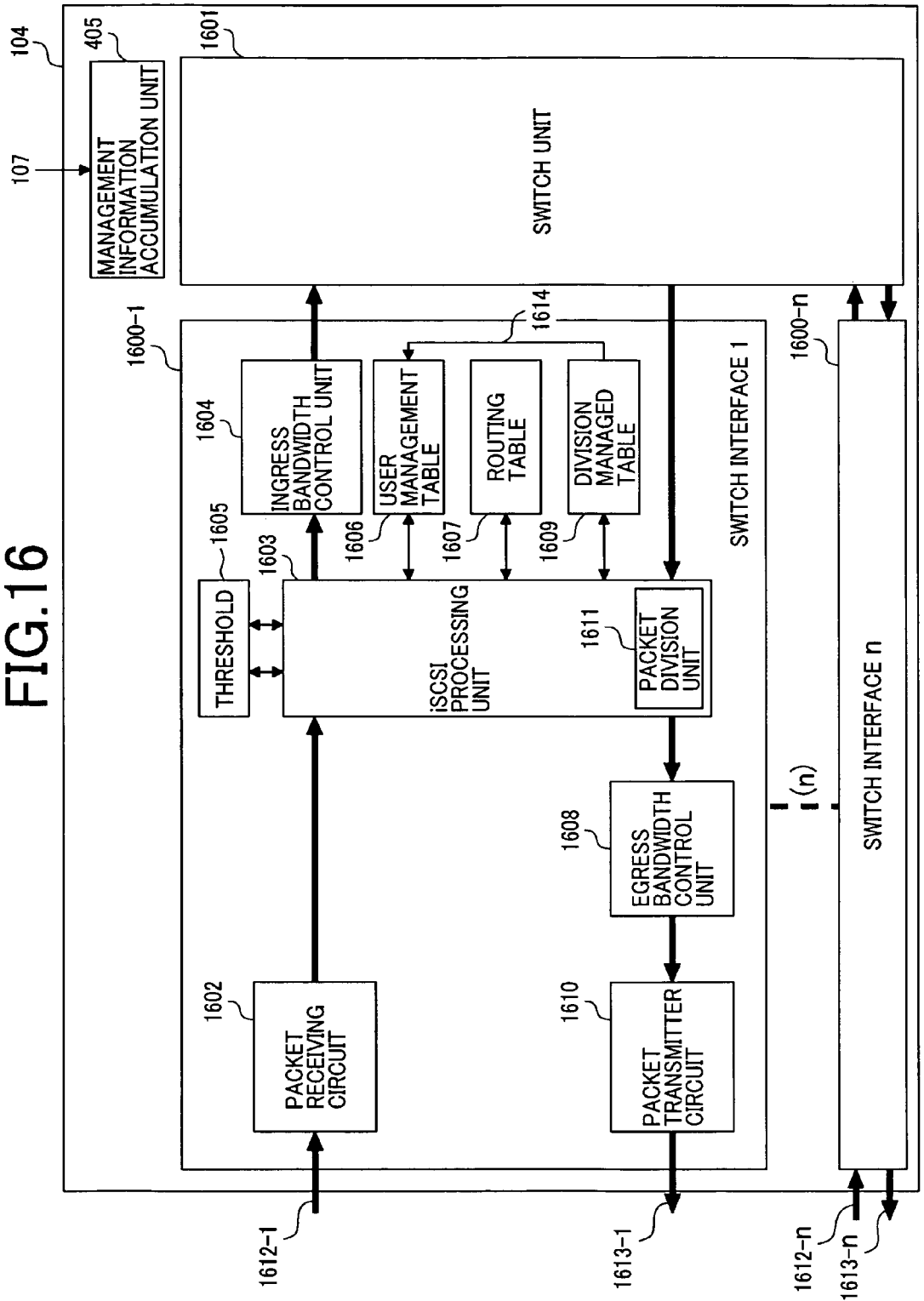
FIG. 16 is a diagram showing the structure of the storage switch for subdividing the data request packets and performing bandwidth control.

FIG. 16 shows the storage switch 104 of the present invention. The storage switch 104 is comprised of n number of input ports 1612-*i* (i=1 through n) for inputting packets, and n number of output ports 1613-*i* (i=1 through n) for outputting packets and, n number of switch interfaces 1600-*i* (i=1 through n) and, a switch unit 1601.

The switch interfaces 1600-*i* are comprised of a packet receiving circuit 1602 for receive processing of packets; an iSCSI processing unit 1603 containing a packet division unit 1611 for subdividing the data request packets when the request data length is large and for establishing the storage volume configuration information of the storage devices 105-*i* and for terminating the iSCSI packet and the user 100 authentication processing; and a threshold (register) 1605 to monitor the upper limit of the RD data size and WR data size capable of being requested in one data request packet for each user; and an ingress bandwidth control unit 1604; an egress bandwidth control unit 1608; a packet transmitter circuit 1610 for transmitting packets; and a user management table 1606 for managing information on the size (volume) of the storage devices 105-*i* as well as the storage size (volume) of the storage devices 105-*i* accessible by the user 100; and a routing table 1607 to manage the IP packet routing information; and a division management table 1609 to manage information on the structure of the data request packet before and after being subdivided by the iSCSI processing unit 1603. The IP addresses are assigned to the switch interfaces 1600-*i*. In FIG. 16, one input/output port is shown for each switch interface; however, there is no problem with using multiple ports.

The storage switch of the present embodiment differs from the storage switch of the second embodiment only in containing a packet division unit 1611 in the iSCSI processing unit 1603; containing a threshold (register) for managing in user units, the upper limit of data size requestable in one data request packet in user units; and containing a division management table 1609 for managing information on data request packet subdivided in the iSCSI processing unit 1603; and containing subdivided control bits in the user management table 1604.

After the data request packet has been received from the packet receiving circuit 1602 and the processing by the iSCSI processing unit 1603 as described in the second embodiment performed, the largest data length for each user managed in the threshold 1605 (in other words, the upper limit on the requestable data size) is loaded (read out), the size is compared with expected data transfer length 706. The value in the threshold 1605 can be set from the console 107. When results from comparing show that expected data transfer length 706 is a greater size than the maximum request data length, this indicates that packet subdivision was performed with the subdivision control bits in the user management table 1606. The subdividing in the packet division unit 1611 is performed next.

The packet division unit 1611 divides up those data request packets that exceed the maximum data length. The processing for the R2T packets and the RD request packets is respectively different.

The processing used when the data request packet is the R2T request packet is described next.

The iSCSI processing unit 1603 that received an R2T packet addressed to its own interface, loads (reads out) the maximum request data length for the corresponding user from the threshold (register) 1605 and compares the requested data length. If the requested data length exceeds the maximum requested data length, then the iSCSI processing unit sets the packet information described in related art technology 1 along with the packet division flag and manages this in the user management table 1606. The iSCSI processing unit next issued a division request along with the R2T packet to the packet division section. The packet division section makes n number of copies of the original R2T packet (For example, if the request WR length is 96 kilobytes, and the maximum request data length is 24 kilobytes, then n=4 is the number of copies.) The request WR length 803 is rewritten to the maximum request data length, and in the case of the first R2T packet, is set to 0 in the R2TSN 802. Information such as the initiator task tag of the divided R2T packet, the target task tag, the R2TSN of the source R2T packet, the number of divided elements, and the R2TSN assigned to the R2T packet after division, are written in the division management table, and the R2T packet conveyed to the iSCSI processing unit.

After receiving a WR data packet addressed to its own interface, the iSCSI processing unit 1603 establishes the user identification number in the user management table 1606 and then checks the subdivision control bits. If the subdivision control bits have been set, then the packet is conveyed to the packet division section. The packet division section 1611 searches the division management table 1609 from the initiator task tag, the target task tag, and user identification number, and acquires information matching the received WR data packet from the division management table 1609. The initiator sets a 1 in the F bit in the final WR data packet corresponding to the R2T packet. However, when the R2T packet has been divided, an as yet undivided R2T packet might possibly be en-route even if a 1 has been set in the F bit of the WR data packet. Therefore, if the received WR data packet corresponds to the divided R2T packet, then the division management table determines the current number of bytes in the received WR data packet.

Even if the F bit has been set to a 1, if the as yet undivided R2T is the enroute packet, then the F bit is changed to 0. The DataSN 901 of the WR data packet in R2T packet units is reset. However the value is continuously changed in the case of a WR data packet corresponding to the divided R2T packet. The packet is then transferred to the ingress bandwidth control unit 1604. The information for implementing these processes is managed in the division management table. When finished transmitting all the WR data packets corresponding to the original R2T packet, the entry is deleted from the division management table. At the same time, the division management table issues the entry deletion signal 1614 to instruct the deleting from the user management table of the entry just deleted from the division management table. The user management table 1606 that received the entry deletion signal 1614 then deletes the corresponding entry.

By dividing the R2T packet using the above method, an R2T packet that exceeds the maximum requested data length can be transferred to the user 100, and the transmitting of large amounts of data from the user 100 occurring in bursts on the network can be prevented.

By managing the R2T packets using the above method, the switch can divide and transmit the R2T packets without the user 100 and the storage device 105 being aware of this process.

The processing when the requested data packet is the RD request packet is described next.

The RD request packet contains the CDB (Command Descriptor Block) of the SCSI in the header section. The SCSI CDB of the RD request packet holds information on the number of blocks of data for transfer and the block address for RD data storage. Therefore, the SCSI CDB block address value and the number of transfer blocks must be changed when dividing the packet. In order to change the number of transfer blocks and the block addresses, the storage switch must know the size (hereafter the block size) of one block used by the storage devices 105-$i$. The division management table 1609 therefore controls the one block size in the storage device 105-$i$. The size of one block can be acquired along with the information during SCSI login. This value can also be set from the console 107.

The iSCSI processing unit 1603 that received an RD request packet addressed to its own interface from the initiator, loads (reads out) the maximum request data length for the corresponding user from the threshold (register) 1605 and compares the requested data length. If the requested data length exceeds the maximum requested data length, then the iSCSI processing unit sets the packet information described in related art technology 1 along with the packet division flag and manages this in the user management table. The iSCSI processing unit next issues a division request along with the RD request packet to the packet division section. The packet division section makes n number of copies of the original RD request packet (For example, if the requested length is 96 kilobytes, and the maximum request data length is 24 kilobytes, then n=4 is the number of copies.). The request data length is next rewritten to the maximum request data length, and the number of SCSI CDB transfer blocks and block addresses are rewritten. The number of transfer blocks is found from the maximum requested data length and the number of blocks (in 1 block sizes) amounting to the same size as the maximum requested data length and this value then written. The value of the original RD request packet SCSI CDB block address is written in the SCSI CDB of the first RD request packet after division, as the block address. The block address is set from the second time onwards, following the previous data that was sent. Information such as the initiator task tag of the divided RD request packet, the target task tag, the number of divisions of the source RD request packet, are written in the division management table.

After receiving a RD data packet addressed to its own interface from the target, the iSCSI processing unit 1603 establishes he user identification number in the user management table 1606 and then checks the subdivision control bits. If the subdivision control bits have been set, then the packet is conveyed to the packet division section 1611. The packet division section 1611 searches the division management table 1609 to confirm from the initiator task tag, the target task tag, and user identification number, and which divided RD packet corresponds to the received RD data packet. The target sets a 1 in the F bit of the last RD data packet for the RD request packet. However, when the RD packet has been divided, an as yet undivided RD packet might possibly be enroute even if a 1 has been set in the F bit of the RD data packet. Therefore, if the received RD data packet corresponds to the divided RD data packet, then the division management table monitors the current number of bytes of the transmitted RD data packet, and changes the F bit to a 0, even when the F bit was set to a 1 in the source RD request packet.

The DataSN 901 of the RD data packet in RD request packet units is reset. However the value is continuously changed in the case of a RD data packet corresponding to the divided RD request packet. That packet is then transferred to the egress bandwidth control unit 1608. The information for implementing these processes is managed in the division management table. When finished transmitting all the RD data packets corresponding to the source RD request packet, the entry is deleted from the division management table. At the same time, the division management table issues the deletion signal 1614 to instruct the deleting from the user management table, of the entry that was just deleted from the division management table. The user management table 1606 that received the entry deletion signal 1614 then deletes that corresponding entry.

By dividing the RD request packet using the above method, an RD request packet that exceeds the maximum requested data length is transferred to the storage device 105 so that transmitting large amounts of data from the storage device 105 in bursts on the network can be prevented.

By managing the RD request packets using the above method, the switch can divide and transmit the RD request packet without the user 100 and the storage device 105 being aware of this process.

The switch unit 1601, the packet receiving circuit 1602, the iSCSI processing unit 1603, the ingress bandwidth control unit 1604, an egress bandwidth control unit 1608, a packet transmitter circuit 1610 are implemented by function modules containing processing devices and storage devices. The threshold (register) 1605 is implemented by storage devices. The user management table 1606, the routing table 1607, and the division management table 1609 are respectively executed by the storage devices. However, other structures may be used if the objects of the present invention can be attained with functions equivalent to the device structure in FIG. 16.

By adding a function to divide the data request command shown in the third embodiment to the storage switch containing the bandwidth control function for iSCSI, the bandwidth can be controlled in smaller units than in the second embodiment. Bandwidth control can therefore be provided that suppresses data bursts even more than the second embodiment.

Fourth Embodiment

In the second embodiment and the third embodiment, the storage switch 104 in the datacenter 103, and the packet switching system connecting the wide area network 102 and the datacenter 103 were isolated from each other.

In the fourth embodiment, a structure is described wherein the packet switching system 101-2 is integrated with the storage switch 104 and the IP, iSCSI, and FC protocols are all supported in one unit.

Figure 17:
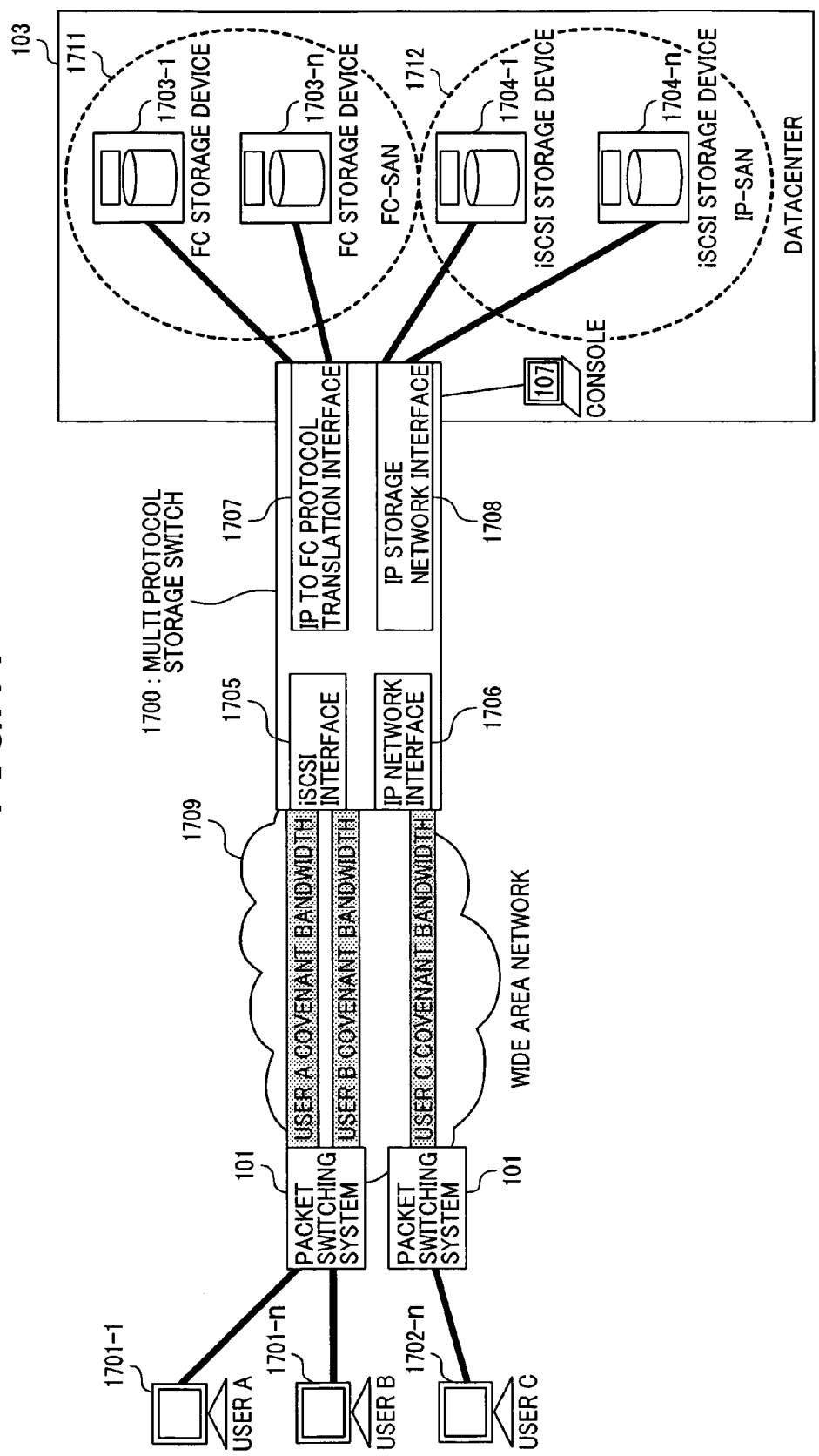
FIG. 17 is a diagram showing one example of a network using the multi-protocol storage switch combining the packet switching system with the storage switch device of the present invention.

FIG. 17 shows the multi protocol storage switch 1700. This switch is installed between the datacenter and the wide area network and fulfills the role of both the packet switching system 101-2 and the storage system 104.

The multi protocol storage switch 1700 is installed in the datacenter 103 and forms a SAN 106 connected by an IP network or FC network, with a storage devices 105-*i* such as a RAID device or JBOD (Just Bunch of Disks). The multi protocol storage switch 1700 and the storage device 105-*i* may also be in a configuration connected by way of multiple switches.

The multi protocol storage switch 1700 is shown in detail in FIG. 20. The multi protocol storage switch 1700 is made up of an iSCSI interface 1705, a network IP interface 1706, an IP/FC converter interface 1707, a storage network IP interface 1708, and a switch unit. An optimal interface can be selected from among the four types of interfaces according to the network connecting to the multi protocol storage switch 1700.

The iSCSI interface 1705 is used to connect to the network over which the user is accessing the storage device. The main elements of the iSCSI interface 1705 are the iSCSI processing unit 403, the ingress bandwidth control unit 404, the egress bandwidth control unit 408, and the bandwidth monitoring unit 2004. The iSCSI processing unit 403, the ingress bandwidth control unit 404, the egress bandwidth control unit 408 are the same as for the storage switch 104. The bandwidth monitoring unit 2004 monitors whether or not the size of the data sent from the multi protocol storage switch 1700 to the wide area network exceeds the user contract bandwidth. When the size of the data sent to the wide area network exceeds the user contract bandwidth, the bandwidth monitoring unit 2004 discards data exceeding the user contract bandwidth or sets a lower order of priority for data transfer to the network, etc.

The network IP interface 1706 is used to connect to a network for users not accessing the storage device. The main elements of the network IP interface 1706 are the bandwidth monitoring unit 2004 and the IP routing unit 2005. The IP routing unit 2005 performs routing such as searches for IP packet destination addresses.

The IP/FC converter interface 1707 is an interface for connecting FC protocol storage devices or FC protocol computers. The main elements of the IP/FC converter interface 1707 are the IP to FC protocol translation circuit 2006 and the FC send and receive circuit 2007 The IP to FC protocol translation circuit 2006 is characterized in having a function to converting the FC protocol that was input and the IP. The FC send and receive circuit 2007 sends and receives the FC data.

The storage network IP interface 1708 connects the iSCSI storage device and the network without bandwidth control and without a contract bandwidth. The main elements of the storage network IP interface 1708 is the IP routing unit 2005.

The iSCSI processing unit 403, the ingress bandwidth control unit 404, the egress bandwidth control unit 408, the bandwidth monitoring unit 2004, the IP routing unit 2005, the IP to FC protocol translation circuit 2006, and the FC send and receive circuit 2007 are respectively implemented by processing devices and memory devices. However, other structures may be used if the objects of the present invention can be attained with functions equivalent to the device structure in FIG. 20.

Utilizing this embodiment allows implementing the packet switching system 101-2 and the storage switch 104 in one unit.

What is claimed is:

1. A packet switching system connected with a first and a second device over a network, comprising: a packet input/output section for receiving packets sent from the first device, and sending packets to the second device; a packet analysis section for analyzing the amount of data sent to the first device from the second device, based on information inside the received packet, when the packet input/output section has received the packet; a storage device for holding the packet; a packet processing unit for writing the packet onto the storage device; a transmit controller for controlling the transmission of the held packet to the second device according to a guaranteed bandwidth for a user and the amount of analyzed data, wherein the packet processing unit decides whether or not the packet that was input is a packet requesting the transmission of data to the second device, and the packet analysis section analyzes only the packet determined by the packet processing unit as the packet requesting transfer of data to the second device.

2. A packet switching system according to claim 1, wherein the transmit controller controls the traffic volume of data sent from the packet switching system to the second device so as not to exceed the predetermined bandwidth.

3. A packet switching system according to claim 1, wherein said transmission controller controls the time for outputting the packet to the second device.

4. A packet switching system according to claim 1, wherein the input/output section inputs a plurality of packets respectively sent from a plurality of devices including the first device, and the transmission controller selects one packet from the plurality of packets, gives the selected one packet priority and sends that selected packet.

5. A packet switching system according to claim 1, wherein the packet processing unit contains a packet division unit to divide up the retained packet into a plurality of packets and send the plurality of packets.

6. A packet switching system according to claim 5, wherein the multiple divided packets sent to the second device from the packet processing unit are respectively divided so as to have a data size slightly smaller than a data size prior to packet division.

7. A packet switching system according to claim 6, wherein the packets are divided so that data size of each of the plurality of divided individual packets does not exceed an upper preset limit.

8. A packet switching system connected to a first network and a second network, and capable of transferring packets sent from a source device on the first network, to a destination device on the second network, comprising:

a first interface;

at least one of second through fourth interfaces; and a switch unit connecting with each of the interfaces, wherein
the first interface connected to the first network, comprises:
an input/output section for sending and receiving packets of a first protocol sent from a source device to the destination device;
   a transfer processor section for transferring the packet of the first protocol;
   a packet analysis unit for analyzing the size of the data from information within a packet received by the input/output section and sent to the destination device;
   a storage section for storing the received packet of the first protocol; and
   a transmission controller for controlling the transmitting of the stored packet to the destination according to a guaranteed bandwidth for a user and the size of the analyzed data,
the second interface connected to the first network, comprises:
an input/output section for sending and receiving packets of a second protocol sent from the source device to the destination device;
a transfer processor section for transferring the packet of the second protocol,
the third interface connected to the second network, comprises:
an input/output section for sending and receiving packets of a first or a second protocol sent from the source device to the destination device;
a converter section for converting the packets of the first or the second protocol to packets of a third protocol; and
a transfer processor section for transferring the packets converted to the third protocol, and
the fourth interface connected to the second network, comprises:
an input/output section for sending and receiving packets of a first or a second protocol sent from the source device to the destination device; and
a transfer processor section for transferring the packets of the first or the second protocol; and
the switch unit controls input/output destinations of packets transferred among the interfaces.

9. A packet switching system according to claim 8, wherein the first protocol is iSCSI, the second protocol is TCP/IP, and the third protocol is a fiber channel.

* * * * *